US012754274B2

United States Patent
Choi et al.

(10) Patent No.: US 12,754,274 B2
(45) Date of Patent: Oct. 6, 2026

(54) ELECTRONIC DEVICE FOR DETERMINING ANGLE-OF-ARRIVAL OF SIGNAL, AND METHOD FOR OPERATING ELECTRONIC DEVICE

(71) Applicant: Samsung Electronics Co., Ltd., Suwon-si (KR)

(72) Inventors: Kunyoung Choi, Suwon-si (KR); Doosuk Kang, Suwon-si (KR); Moonseok Kang, Suwon-si (KR); Hyunchul Kim, Suwon-si (KR); Yi Yang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 260 days.

(21) Appl. No.: 18/431,487

(22) Filed: Feb. 2, 2024

(65) Prior Publication Data

US 2024/0175962 A1 May 30, 2024

Related U.S. Application Data

(63) Continuation of application No. PCT/KR2022/011641, filed on Aug. 5, 2022.

(30) Foreign Application Priority Data

Aug. 10, 2021 (KR) ........................ 10-2021-0105167

(51) Int. Cl.
*G01S 3/04* (2006.01)
*G01S 3/02* (2006.01)

(52) U.S. Cl.
CPC .............. *G01S 3/043* (2013.01); *G01S 3/023* (2013.01)

(58) Field of Classification Search
CPC .......... G01S 7/40; G01S 7/403; G01S 7/4034; G01S 7/4091; G01S 13/931; G01S 2013/0254
(Continued)

(56) References Cited

U.S. PATENT DOCUMENTS 6,011,511 A * 1/2000 Chuong ................. H01Q 1/125 342/359
6,459,903 B1 10/2002 Lee
(Continued)

FOREIGN PATENT DOCUMENTS

CN 112731274 A 4/2021
JP 5079660 B2 11/2012
(Continued)

OTHER PUBLICATIONS

International Search Report dated Nov. 14, 2022, issued in International Application No. PCT/KR2022/011641.
(Continued)

*Primary Examiner* — Michael W Justice
(74) *Attorney, Agent, or Firm* — Jefferson IP Law, LLP

(57) ABSTRACT

An electronic device is provided. The electronic device includes an ultra-wideband (UWB) communication circuit including at least one antenna for acquiring signals from an external electronic device, a processor operatively connected with the UWB communications circuit, and memory operatively connected with the processor. The memory may store one or more instructions which, when executed, cause the processor to obtain at least one signal from the at least one antenna, determine a phase-difference-of-arrival of the at least one signal, obtain information related to the state of the electronic device, obtain a calibration value corresponding to the obtained state information of the electronic device from the memory, and determine the angle-of-arrival of the
(Continued)

(a) (b) (c) (d)

at least one signal based on the phase-difference-of-arrival of the at least one signal and the calibration value.

13 Claims, 16 Drawing Sheets

(58) Field of Classification Search
USPC .................................................... 342/70, 174
See application file for complete search history.

(56) References Cited

U.S. PATENT DOCUMENTS 7,046,191 B2 * 5/2006 Tokutsu ................ G01S 7/4026 342/174
7,498,971 B2 * 3/2009 Takagi .................. G01S 7/4004 342/72
8,144,051 B2 * 3/2012 Lok ........................... G01S 7/36 342/368
8,878,719 B2 * 11/2014 Nakabayashi ........ G01S 7/4008 342/174
10,361,482 B2 7/2019 McCarthy et al.
10,917,870 B2 2/2021 Pan et al.
11,105,883 B2 * 8/2021 Videtich .............. H01Q 1/3241
11,121,464 B2 * 9/2021 Ge ..................... G01R 29/0871
11,150,317 B2 * 10/2021 Stitt ...................... H04W 88/02
11,223,136 B2 * 1/2022 Ahmed ..................... G01S 3/46
11,237,244 B2 * 2/2022 Jager ....................... G01S 3/043
11,509,051 B2 * 11/2022 Nagaishi ................... G01S 7/03
11,509,369 B2 * 11/2022 Ji .......................... H04L 1/0023
11,906,653 B2 * 2/2024 Mihlin .................. G01S 7/4095
12,085,657 B2 * 9/2024 Chen ......................... G01S 3/48
12,199,338 B2 * 1/2025 Shams .................. G01S 13/931
2004/0239557 A1 * 12/2004 Tokutsu ................ G01S 7/4026 342/174
2008/0224916 A1 * 9/2008 Takagi .................. G01S 7/4004 342/91
2010/0295732 A1 11/2010 Lee et al.
2011/0080267 A1 4/2011 Clare et al.
2011/0309972 A1 * 12/2011 Lok ......................... G01S 7/023 342/161
2012/0050094 A1 * 3/2012 Nakabayashi ........ G01S 7/4008 342/174
2014/0141733 A1 * 5/2014 Wong ....................... H04B 1/40 455/90.3
2018/0287568 A1 * 10/2018 Malik ................. H04L 25/0222
2019/0064312 A1 * 2/2019 Jeon .................... G01S 5/02521
2019/0120954 A1 4/2019 Kim et al.
2019/0391224 A1 * 12/2019 Stitt .......................... G01S 3/48
2020/0018818 A1 * 1/2020 Jager ....................... G01S 3/043
2020/0021011 A1 1/2020 Cooper et al.
2020/0033436 A1 * 1/2020 Videtich ................. G01S 3/043
2020/0057130 A1 2/2020 Simileysky
2020/0358177 A1 * 11/2020 Ge ....................... H01Q 3/2611
2020/0358178 A1 * 11/2020 Nagaishi ................ H01Q 21/22
2020/0373675 A1 * 11/2020 Ahmed .................... H01Q 1/38
2021/0076350 A1 * 3/2021 Yang ................... H04W 52/283
2021/0143879 A1 * 5/2021 Ji ......................... H04B 7/0626
2021/0293950 A1 * 9/2021 Shams ................. H01Q 1/3233
2021/0296764 A1 * 9/2021 Shams .................. G01S 13/931
2021/0364596 A1 * 11/2021 Roger ................... G01S 7/2883
2021/0364622 A1 * 11/2021 Roger ................... G01S 13/584
2022/0365174 A1 * 11/2022 Mihlin .................. G01S 7/4086
2022/0390541 A1 * 12/2022 Chen .......................... G01S 5/04
2023/0092131 A1 * 3/2023 Lao ........................... G01S 7/35 342/200

FOREIGN PATENT DOCUMENTS

KR 10-2000-0060020 A 10/2000
KR 10-1012709 B1 2/2011
KR 10-1482650 B1 1/2015
KR 10-2019-0024087 A 3/2019
KR 10-2021-0007225 A 1/2021

OTHER PUBLICATIONS

European Search Report dated Oct. 1, 2024, issued in European Application No. 22856114.8.

* cited by examiner (b)

(a)

ELECTRONIC DEVICE FOR DETERMINING ANGLE-OF-ARRIVAL OF SIGNAL, AND METHOD FOR OPERATING ELECTRONIC DEVICE

CROSS-REFERENCE TO RELATED APPLICATION(S)

This application is a continuation application, claiming priority under § 365(c), of an International application No. PCT/KR2022/011641, filed on Aug. 5, 2022, which is based on and claims the benefit of a Korean patent application number 10-2021-0105167, filed on Aug. 10, 2021, in the Korean Intellectual Property Office, the disclosure of which is incorporated by reference herein in its entirety.

BACKGROUND

1. Field

The disclosure relates to an electronic device for determining an angle-of-arrival of a signal and a method of operating the electronic device. More particularly, the disclosure relates to an electronic device capable of identifying a relatively location of an external electronic device by determining an angle-of-arrival (AoA) of a signal received from the external electronic device and a method of operating the electronic device.

2. Description of Related Art

An electronic device may detect a location of an external device, thereby providing various services, such as a function of sharing files between devices (quick share application or nearby share) and finding of a location of a device (smart things finding).

Ultra-wideband (UWB) is a short-range wireless communication technology for transmitting and receiving data to a wide frequency band through a short-time pulse. Recently, a UWB module is used but also in short-range wireless communication but also in an application field. For example, the UWB module may be used in various application fields, such as distance measurement according to two way ranging (TWR) and time difference of arrival (TDOA) corresponding to schemes using time of arrival of radio waves and angle measurement according to an angle of arrival (AOA) corresponding to a scheme using radio wave transmission/reception angle of an antenna.

Methods of estimating an angle of arrival or an incident angle may be divided into a method using a directional antenna and a method using an array antenna. The method using the directional antenna scans an incident angle or an angle of arrival of a received signal while sequentially rotating a fixed directional radiation pattern. Further, the method using the array antenna estimates an incident angle or an angle of arrival based on a received signal in each of the antenna elements included in the array antenna.

The electronic device may identify a relatively location of a target device (a device transmitting a signal) from the electronic device as an angle of arrival (AOA) of a received signal is found. The electronic device may determine the relatively location (for example, direction) of the target device by using a phase difference between signals received through a plurality of antennas. The electronic device may determine an angle of arrival of the received signal by using a phase difference between signals received through respective antennas.

The above information is presented as background information only to assist with an understanding of the disclosure. No determination has been made, and no assertion is made, as to whether any of the above might be applicable as prior art with regard to the disclosure.

SUMMARY

In order to determine an angle-of-arrival (AoA), a phase-difference-of-arrival (PDoA) of signals measured by two or more antennas is used. For example, the AoA is determined by putting the PDoA of the signal into a predetermined equation.

It is required to determine d and $\Delta\Phi$ corresponding to calibration values to calibrate actual data values in an equation of determining an AoA by using a PDoA of the signal. d is a calibration value related to a distance between two antennas, and $\Delta\Phi$ may be a calibration value related to an offset value for a phase difference. In general, a calibration value is stored in a register of an electronic device for performing an AoA function, and an AoA is calculated by applying the value whenever a PDoA of the signal is measured. The calibration value is generally a fixed value which does not consider a state of the electronic device.

On the other hand, the PDoA varies depending on the state of the electronic device. For example, in the case of a foldable electronic device, the measured PDoA of the signal varies depending on a folded state or an unfolded (open) state of the display. In another example, the measured PDoA of the signal varies depending on a state (covered) in which a cover is mounted to the electronic device and a state (not-covered) in which no cover is mounted). In another example, when an application based on augmented reality uses an AoA function, such as displaying information related to an external object on a screen captured by a camera, the location of the antenna is different from the center of the camera and thus AoAs measured by the external object displayed on the screen and the antenna is different. In another example, when a plurality of antennas are included in the electronic device, the PDoA of the signal varies depending on the arrangement or type of combinations of cameras to be used for the AoA function among the plurality of antennas.

Accordingly, when the AoA is calculated through the application of a fixed calibration value, the accuracy deteriorates according to the state of the electronic device.

Aspects of the disclosure are to address at least the above-mentioned problems and/or disadvantages and to provide at least the advantages described below. Accordingly, an aspect of the disclosure is to provide an electronic device that identifies the state of the electronic device and calculate the AoA by using a calibration value corresponding to the state of the electronic device. For example, according to various embodiments of the disclosure, a calibrated AoA is obtained according to the state of the electronic device, such as a current cover of the electronic device, an inclination, a foldable state, or a rollable state, during a process of calculating the angle-of-arrival (AoA) from the PDoA of the signal measured by the antenna based on UWB communication.

Additional aspects will be set forth in part in the description which follows and in part, will be apparent from the description, or may be learned by practice of the presented embodiments.

In accordance with an aspect of the disclosure, an electronic device is provided. The electronic device includes a UWB communication circuit including at least one antenna for acquiring signals from an external electronic device, a processor operatively connected with the UWB communications circuit, and memory operatively connected with the processor. The memory stores one or more instructions which, when executed, cause the processor to obtain at least one signal from the at least one antenna, determine a phase-difference-of-arrival of the at least one signal, obtain information related to the state of the electronic device, obtain a calibration value corresponding to the obtained state information of the electronic device from the memory, and determine the angle-of-arrival of the at least one signal based on the phase-difference-of-arrival of the at least one signal and the calibration value.

In accordance with another aspect of the disclosure, a method of operating an electronic device is provided. The method includes acquiring at least one signal from the at least one antenna, determining a phase-difference-of-arrival of the at least one signal, acquiring information related to a state of the electronic device, acquiring a calibration value corresponding to the acquired state information of the electronic device from a memory, and determining an angle-of-arrival, based on the phase-difference-of-arrival of the at least one signal and the calibration value.

According to various embodiments of the disclosure, the electronic device can accurately detect a location of an external electronic device by calibrating a signal acquired from the external electronic device, based on a state of the electronic device.

According to various embodiments of the disclosure, in the case of a foldable electronic device, the electronic device can increase the accurate of an angle-of-arrival of a signal in a folded state and an unfolded state.

According to various embodiments of the disclosure, the electronic device can increase the accuracy of the angle-of-arrival of the signal in a state in which a case is attached and a state in which no case is attached.

According to various embodiments of the disclosure, the electronic device can increase the accuracy of the angle-of-arrival of the signal in a state in which an application using augmented reality is executed.

According to various embodiments of the disclosure, the electronic device can increase the accuracy of the angle-of-arrival of the signal in a state in which a combination of specific antennas is used.

According to various embodiments of the disclosure, the electronic device can increase the accuracy of the angle-of-arrival of the signal by differently configuring a calibration value for each target section.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
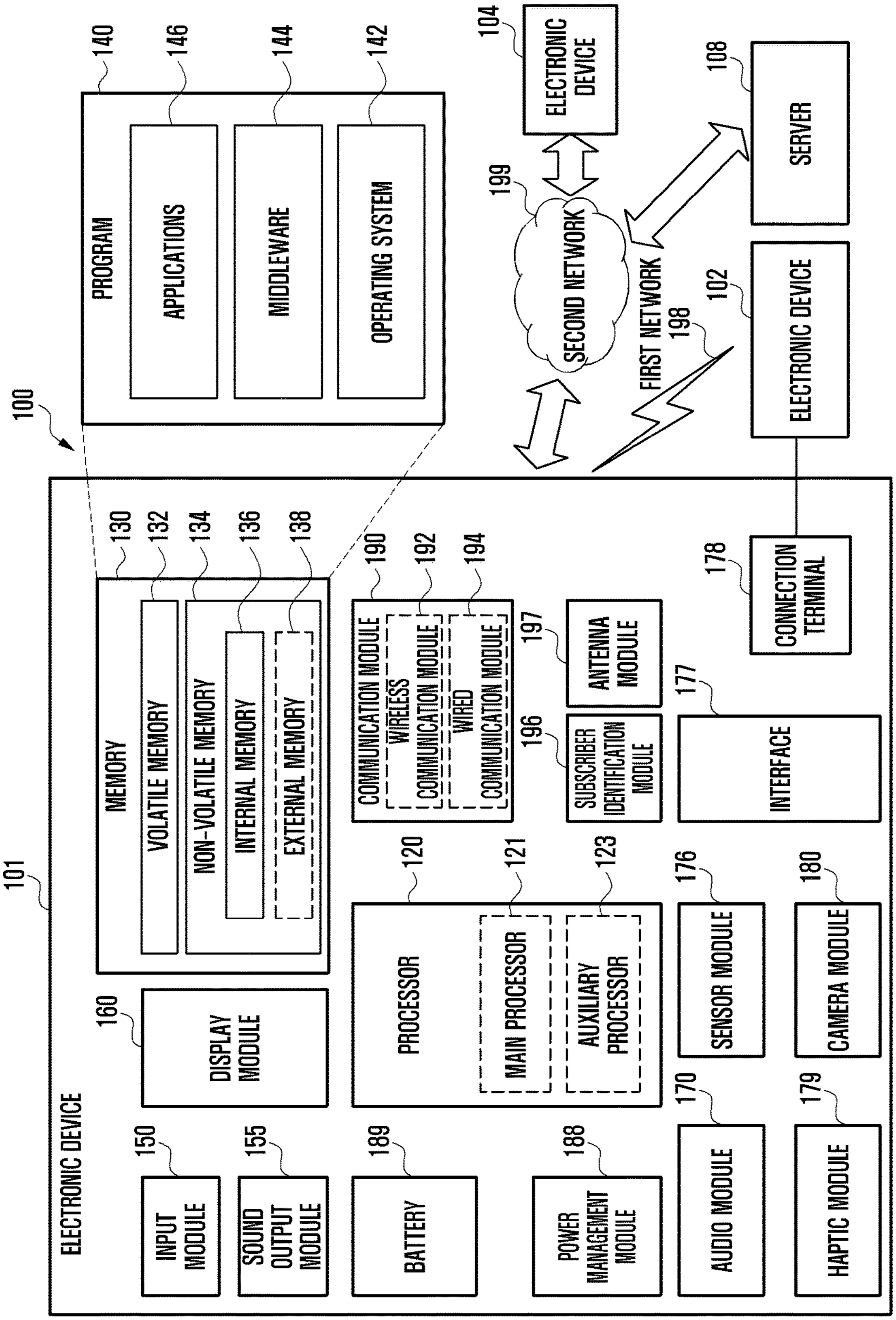
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display module 160 or the camera module 180) of the components may be omitted from the electronic device 101, or one or more other components may be added in the electronic device 101. In some embodiments of the disclosure, some of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 includes an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment of the disclosure, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
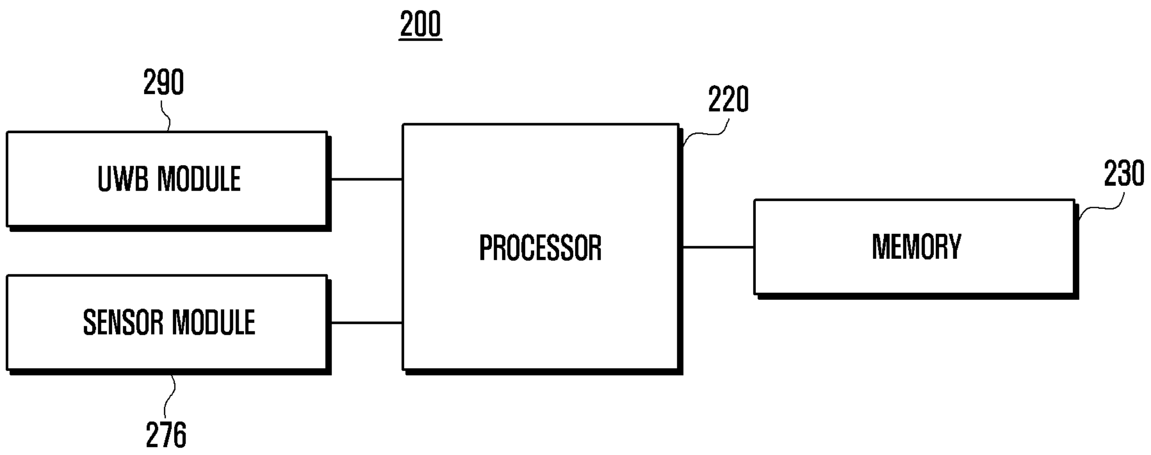
FIG. 2 is a block diagram of an electronic device according to an embodiment of the disclosure.

FIG. 2 is a block diagram of an electronic device according to an embodiment of the disclosure.

Referring to FIG. 2, an electronic device 200 may include a processor 220 (for example, the processor 120 of FIG. 1), a memory 230 (for example, the memory 130 of FIG. 1), a sensor module 276 (for example, the sensor module 176 of FIG. 1), and/or a UWB module 290. The elements included in FIG. 2 are some of the elements included in the electronic device 200, and the electronic device 200 may additionally include various elements as illustrated in FIG. 1

The UWB module 290 according to various embodiments may be a communication circuit supporting an ultra-wideband (UWB) wireless communication scheme. Although it is assumed and described that the electronic device 200 supports a UWB communication scheme in the specification, the UWB module 290 may be replaced with a communication module supporting various communication schemes capable of measuring a distance from an external electronic device. According to an embodiment of the disclosure, the UWB module 290 may include at least one UWB antenna.

The sensor module 276 according to various embodiments may acquire information related to a state of the electronic device 200.

According to various embodiments of the disclosure, the sensor module 276 may acquire information related to a physical state of the electronic device 200.

According to an embodiment of the disclosure, the sensor module 276 may acquire information related to a position (for example, inclination, a holding state, or a laid state) and/or a charging state. For example, the sensor module 276 may include a gravity sensor, an acceleration sensor, and/or a gyro sensor to acquire information related to the position of the electronic device 200. For example, the sensor module 276 may acquire whether the electronic device 200 is connected to a charging device to receive power.

According to an embodiment of the disclosure, when the electronic device 200 is a foldable electronic device which can be folded or unfolded, the sensor module 276 may acquire information related to a folding state of the electronic device 200. For example, the sensor module 276 may acquire a folding angle of a display (for example, the display module 160 of FIG. 1).

According to an embodiment of the disclosure, when the electronic device 200 is a rollable electronic device (for example, a slidable electronic device) including a display (for example, the display module 160 of FIG. 1) having a display area which can be expanded and/or reduced, the sensor module 276 may acquire information related to a sliding state of the electronic device 200. For example, the sensor module 276 may acquire an expansion or reduction state of the display (for example, the display module 160 of FIG. 1).

According to an embodiment of the disclosure, the sensor module 276 may include at least two inertia sensors (not shown). For example, the inertia sensor may include a 6-axis sensor. For example, when the display module 160 is folded, the two inertia sensors may be located on different surfaces. For example, the electronic device 200 may include two inertia sensors at locations corresponding to the left side of the upper part of the display module 160 and the right side of the lower part. According to an embodiment of the disclosure, the electronic device 200 may recognize an angle at which the display is folded through the two inertia sensors.

According to an embodiment of the disclosure, the sensor module 276 may include a bending sensor (not shown). For example, the bending sensor may be disposed along one edge side of the display and may have a different resistance value depending on a bending degree. For example, the electronic device 200 may recognize a bending degree (for example, an angle) of the display based on a value of a signal (for example, current) output by the bending sensor with respect to power (for example, current) applied to the bending sensor.

According to an embodiment of the disclosure, the sensor module 276 may include an angle sensor. For example, when at least some of the display module 160 is folded with respect to a predetermined axis, the electronic device 200 may recognize a folding angle of the display module 160 through the angle sensor.

According to various embodiments of the disclosure, the sensor module 276 and/or a communication module (for example, the communication module 190 of FIG. 1) may acquire information related to a case attached to the electronic device 200.

According to an embodiment of the disclosure, the sensor module 276 may acquire information related to the case, such as whether the case is attached and/or a case type, based on a signal acquired from the case attached to the electronic device 200. According to an embodiment of the disclosure, the communication module 190 may acquire information related to the case, such as whether the case is attached and/or a case type, based on a communication signal (for example, short-range communication, such as radio frequency identification RFID communication or near field communication (NFC)) acquired from the case attached to the electronic device 200.

According to an embodiment of the disclosure, the processor 220 may acquire information related to the case based on user input information in response to non-acquisition of the information related to the case attached to the electronic device 200 through the sensor module 276 and/or the communication module 190.

The memory 230 according to various embodiments may be a volatile memory (for example, a random access memory (RAM)), a non-volatile memory (for example, a read only memory (ROM) or a flash memory), or a combination thereof. The memory 230 may store a command or data related to at least one other element of the electronic device 200.

According to an embodiment of the disclosure, the memory 230 may temporarily or non-temporarily store a calibration value including a first calibration value (for example, d in Equation 1) and/or a second calibration value (for example, ΔΦ in Equation 1).

According to an embodiment of the disclosure, the memory 230 may temporarily or non-temporarily store a default calibration value. For example, the default calibration value may be a predetermined value configured in a process stage of the electronic device 200.

According to an embodiment of the disclosure, the memory 230 may store a lookup table of the calibration value corresponding to the state of the electronic device 200. For example, the state of the electronic device 200 may include at least one of a folding state of the electronic device 200, whether the case is attached to the electronic device 200, a type of the case attached to the electronic device 200, an execution state of a specific application, or a state of using a specific antenna. For example, the lookup table may be stored according to the state of the electronic device 200 and may include a first calibration value and/or a second calibration value corresponding to an interval of the target angle. For example, the interval of the target angle is division of intervals in which an angle of arrival is expected to be included within a range from the left −90 degrees to the right 90 degrees based on a direction perpendicular to the front surface as 0 degrees, and the accuracy of determining the angle of arrival may increase by varying the calibration value depending on the internal of the target angle. The memory 230 may store a plurality of lookup tables. Each of the plurality of lookup tables may correspond to the state of the electronic device 200. For example, the plurality of lookup tables may include a lookup table having a first calibration value and/or a second calibration value which can be used in the folded state of the electronic device 200, a lookup table having a first calibration value and/or a second calibration value which can be used for calibration in the unfolded state of the electronic device 200, and a lookup table having a first calibration value and/or a second calibration value which can be used in the state in which the case is not attached to the electronic device 200.

The processor 220 according to various embodiments of the disclosure may acquire information related to a location of an external electronic device through the UWB module 290. According to an embodiment of the disclosure, the processor 220 may determine a direction in which the external electronic device is located based on the UWB module 290 and a communication signal of the external electronic device. For example, the processor 220 may determine angle of arrival (AOA) of the signal acquired from the external electronic device through an antenna included in the UWB module 290. Specifically, the processor 220 may acquire a signal transmitted from the external electronic device through a first antenna and a second antenna included in the UWB module 290. For example, the processor 220 may acquire a phase ($\theta_1$) of the signal received through the first antenna of the UWB module 290 and a phase ($\theta_2$) of the signal received through the second antenna. The processor 220 may determine an angle of arrival (α) of the signal acquired from the external electronic device based on a phase-difference-of arrival (PDoA) ($\Delta\theta=\theta_1-\theta_2$) of the signal acquired through each of the first antenna and the second antenna of the UWB module 290. For example, the processor 220 may determine the angle of arrival (α) by Equation 1.

$$s\Delta\theta - \Delta\Phi = \frac{2\pi d}{\lambda_c}\sin\alpha \quad \text{Equation 1}$$

In Equation 1, s has a value of +1 or −1 and indicates whether a phase is reversed (for example, + direction may mean the right side when s is +1 and mean the left side when s is −1, based on 0 degrees corresponding to a direction perpendicular to a straight line connecting a first antenna and a second antenna), ΔΦ indicates an offset value for a phase difference, d indicates a distance (antenna spacing) between the first antenna and the second antenna, and $\lambda_c$ may be the length of a wavelength of a carrier frequency.

According to an embodiment of the disclosure, s and d are predetermined values and may be stored in the memory 230.

According to an embodiment of the disclosure, the processor 220 may determine a range of a target angle, based on the phase difference of arrival (PDoA). For example, the processor 220 may determine a section of the target angle corresponding to inclusion of the PDoA in a predetermined range.

According to an embodiment of the disclosure, the UWB module 290 may determine the section of the target angle, based on the PDoA. For example, the processor 220 may determine the interval of the target angle as a first target angle section (for example, −90 degrees to −60 degrees) in response to inclusion of the PDoA in a first phase difference section (for example, −180 degrees to −140 degrees). For example, the processor 220 may determine the section of the target angle as a second target angle section (for example, −60 degrees to −20 degrees) in response to inclusion of the PDoA in a second phase difference section (for example, −140 degrees to −40 degrees). For example, the processor 220 may determine the section of the target angle as a third target angle section (for example, −20 degrees to 20 degrees) of the PDoA in a third phase difference section (for example, −40 degrees to 40 degrees). For example, the processor 220 may determine the section of the target angle as a fourth target angle section (for example, 20 degrees to 60 degrees)

of the PDoA in a fourth phase difference section (for example, 40 degrees to 140 degrees). For example, the processor 220 may determine the section of the target angle as a fifth target angle section (for example, 60 degrees to 90 degrees) of the PDoA in a fifth phase difference section (for example, 140 degrees to 180 degrees).

According to an embodiment of the disclosure, the processor 220 may determine the target angle, based on a temporary angle of arrival (AoA). For example, the processor 220 may determine the temporary angle of arrival by inputting a default calibration value stored in the memory 230 into Equation 1. The processor 220 may determine the section of the target angle corresponding to inclusion of the temporary angle of arrival in a predetermined range. For example, the processor 220 determine the section including the temporary angle of arrival as the section of the target angle among the first target angle section (for example, −90 degrees to −60 degrees), the second target angle section (for example, −60 degrees to −20 degrees), the third target angle section (for example, −20 degrees to 20 degrees), the fourth target angle section (for example, 20 degrees to 60 degrees), and/or the fifth target angle section (for example, 60 degrees to 90 degrees).

According to various embodiments of the disclosure, the section of the target angle is not limited thereto, and may be divided in various ways (for example, three sections, four sections, or sections larger than five sections) within a range of the angle of arrival from −90 degrees to 90 degrees.

The processor 220 according to various embodiments of the disclosure may identify information related to the state of the electronic device 200.

The processor 220 according to an embodiment of the disclosure may identify the position of the electronic device 200. For example, the processor 220 may acquire position information including an inclination, a holding state, or a laid state of the electronic device 200 from the sensor module 276.

The processor 220 according to an embodiment of the disclosure may identify a charging state of the electronic device 200. For example, the processor 220 may acquire information relate to whether the electronic device 200 is being charged from the sensor module 276.

The processor 220 according to an embodiment of the disclosure may identify an expansion and/or reduction state of the display module 160 of the electronic device 200. For example, the processor 220 may acquire information related to whether the display area of the display module 160 of the electronic device 200 is expanded and/or reduced from the sensor module 276.

The processor 220 according to an embodiment of the disclosure may identify a folding state of the electronic device 200. For example, the processor 220 may acquire a folding angle of the display module 160 from the sensor module 276. For example, the processor 220 may determine the state of the electronic device 200 as a folded state in response to the folding angle of the display module 160 being or smaller than a predetermined angle (for example, smaller than 10 degrees), and determine the state of the electronic device 200 as an opened state in response to the folding angle of the display module 160 being larger than or equal to the predetermined angle (for example, larger than or equal to 170 degrees). For example, the processor 220 may determine the state of the electronic device 200 as an intermediate state in response to the folding angle of the display module 160 being within a predetermined range (for example, larger than or equal to 10 degrees and smaller than 170 degrees). For example, the processor 220 may determine the state of the electronic device as a first intermediate state, a second intermediate state, a third intermediate state, and/or a fourth intermediate state in response to a range of the folding angle of the display module 160 (for example, larger than or equal to 10 degrees and smaller than 50 degrees, larger than or equal to 50 degrees and smaller than 90 degrees, larger than equal to 90 degrees and smaller than 130 degrees, and/or larger than or equal to 130 degrees and smaller than 170 degrees).

The processor 220 according to an embodiment of the disclosure may identify whether a case is attached to the electronic device 200 and/or a type of the case. For example, the processor 220 may identify the type (for example, material, such as silicon, rubber, or metal or elements (for example, LED) included in the case) of the case attached to the electronic device 220 by using information related to the case attached to the electronic device 200 acquired from the sensor module 276 and/or the communication module 190.

The processor 220 according to an embodiment may identify an execution state of a specific application. For example, the specific application may be an application based on augmented reality like displaying information related to an external object on a screen captured by a camera in an overlay method. For example, the specific application may be an application for determining a location of the external object, based on an angle of arrival (AoA) calculated based on a signal transmitted by the external electronic device and rendering and displaying the location of the external object on the screen captured by the camera.

The processor 220 according to an embodiment of the disclosure may identify a state using a specific antenna. For example, the processor 220 may identify an antenna used for UWB communication among a plurality of antennas included in the UWB module 290. For example, the processor 220 may identify the state in which a first antenna and/or a second antenna is being used. For example, the processor 220 may identify information related to at least one antenna (for example, the location, type, and/or size of the antenna) used for an AoA function.

The processor 220 according to various embodiments of the disclosure may determine an angle of arrival, based on a calibration value acquired from the memory 230. The processor 220 may acquire lookup tables of calibration values corresponding to states of the electronic device 200 from the memory 230. For example, the processor 220 may select a lookup table corresponding to the state of the electronic device 200 from among a plurality of lookup tables and determine an angle of arrival, based on a calibration value included in the selected lookup table.

According to an embodiment of the disclosure, the processor 220 may calibrate a phase difference of arrival (PDoA) by using the calibration value corresponding to the state of the electronic device 200. According to an embodiment of the disclosure, the processor 220 may acquire a first calibration value and/or a second calibration value corresponding to a determined target angle section from the lookup table of the calibration value corresponding to the state of the electronic device 200. According to an embodiment of the disclosure, the processor 220 may determine an angle of arrival ($\alpha$) by putting the first calibration value into d and the second calibration value into $\Delta\Phi$ in Equation 1.

According to an embodiment of the disclosure, the operation of calibrating the phase difference of arrival and the operation of determining the angle of arrival may be performed by the UWB module 290.

Figure 3A:
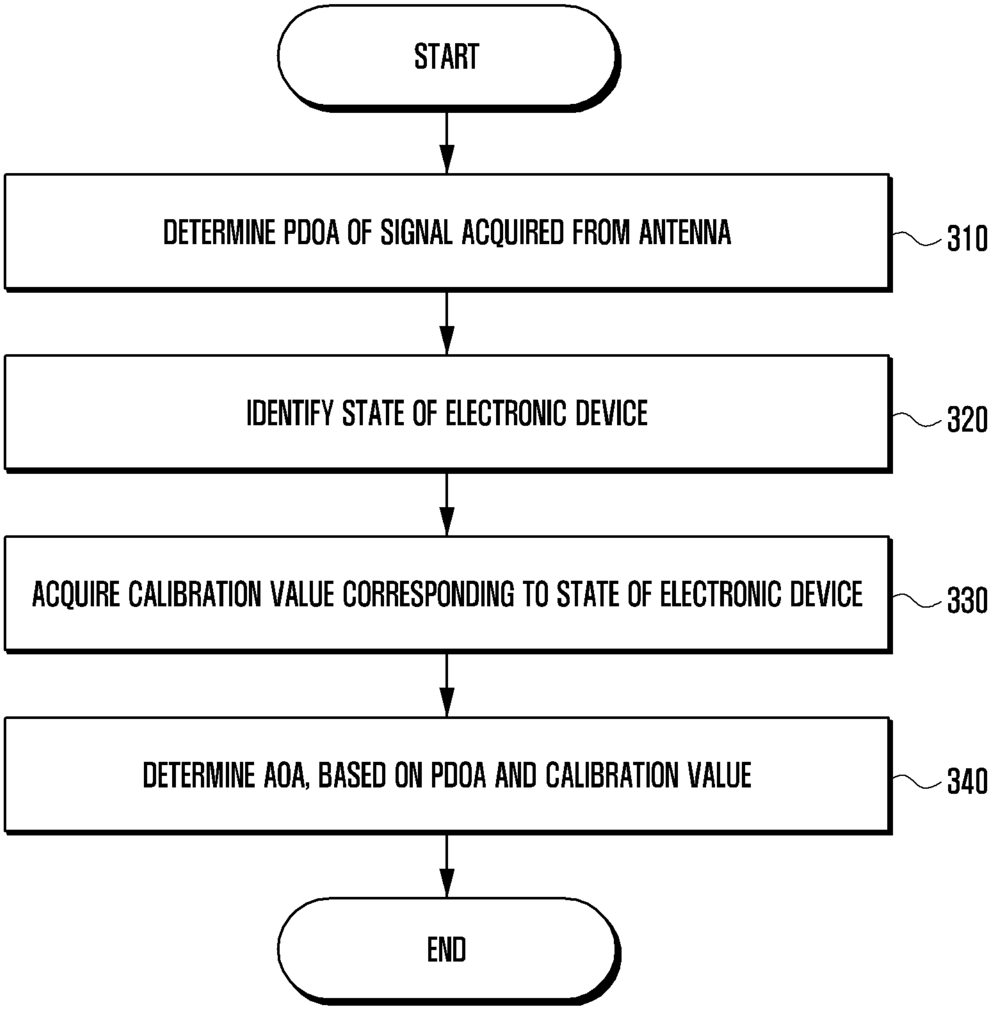
FIG. 3A is a flowchart illustrating a method by which a processor controls an electronic device to determine a calibration value related to an angle of arrival, based on a state of the electronic device according to an embodiment of the disclosure.

FIG. 3A is a flowchart illustrating a method by which a processor controls an electronic device to determine a calibration value related to an angle of arrival, based on a state of the electronic device according to an embodiment of the disclosure.

Referring to FIG. 3A, according to various embodiments of the disclosure, the processor 220 may acquire a signal from an antenna and determine a phase difference of arrival (PDoA) in operation 310.

According to an embodiment of the disclosure, a UWB module (for example, the UWB module 290 of FIG. 2) may perform communication through an ultra-wideband (UWB) wireless communication scheme and may include at least one UWB antenna.

According to an embodiment of the disclosure, the processor 220 may acquire a signal transmitted from an external electronic device through each of a first antenna and a second antenna included in the UWB module 290. For example, the processor 220 may acquire a phase ($\theta_1$) of the signal received through the first antenna of the UWB module 290 and a phase ($\theta_2$) of the signal received through the second antenna. The processor 220 may determine a phase difference of arrival (PDoA) ($\Delta\Phi=\theta_1-\theta_2$) of the signal acquired through each of the first antenna and the second antenna of the UWB module 290.

According to various embodiments of the disclosure, the processor 220 may identify information related to a state of the electronic device 200 in operation 320.

The processor 220 according to an embodiment of the disclosure may identify the position of the electronic device 200. For example, the processor 220 may acquire position information including an inclination, a holding state, or a laid state of the electronic device 200 from the sensor module 276.

The processor 220 according to an embodiment may identify a charging state of the electronic device 200. For example, the processor 220 may acquire information relate to whether the electronic device 200 is being charged from the sensor module 276. In another example, the processor 220 may acquire information related to whether the electronic device 200 is being charged from a power management module (for example, the power management module 188 of FIG. 1), an interface (for example, the interface 177 of FIG. 1), or a connectivity terminal (for example, the connection terminal 178 of FIG. 1).

The processor 220 according to an embodiment may identify an expansion and/or reduction state of the display module 160 of the electronic device 200. For example, the processor 220 may acquire information related to whether the display area of the display module 160 of the electronic device 200 is expanded and/or reduced from the sensor module 276. The processor 220 according to an embodiment may identify a folding state of the electronic device 200.

According to an embodiment of the disclosure, operation 320 may be performed before and/or after operation 310.

For example, the sensor module 276 may acquire information related to the folding state of the electronic device 200. For example, the sensor module (for example, the sensor module 276 of FIG. 2) may include at least two inertia sensors (not shown). For example, the inertia sensor may include a 6-axis sensor. For example, when the display module 160 is folded, the two inertia sensors may be located on different surfaces. For example, the electronic device 200 may include two inertia sensors at locations corresponding to the left side of the upper part of the display module 160 and the right side of the lower part. According to an embodiment of the disclosure, the electronic device 200 may recognize an angle at which the display is folded through the two inertia sensors.

For example, the sensor module 276 may include a bending sensor (not shown). For example, the bending sensor may be disposed along one edge side of the display and may have a different resistance value depending on a bending degree. For example, the electronic device 200 may recognize a bending degree (for example, an angle) of the display based on a value of a signal (for example, current) output by the bending sensor with respect to power applied to the bending sensor.

For example, the sensor module 276 may include an angle sensor. For example, when at least some of the display module 160 is folded with respect to a predetermined axis, the electronic device 200 may recognize a folding angle of the display module 160 through the angle sensor.

For example, the processor 220 may acquire a folding angle of the display module 160 from the sensor module 276. For example, the processor 220 may determine the state of the electronic device 200 as a folded state in response to the folding angle of the display module 160 being or smaller than a predetermined angle (for example, smaller than 10 degrees), and determine the state of the electronic device 200 as an opened state in response to the folding angle of the display module 160 being larger than or equal to the predetermined angle (for example, larger than or equal to 170 degrees). For example, the processor 220 may determine the state of the electronic device 200 as an intermediate state in response to the folding angle of the display module 160 being within a predetermined range (for example, larger than or equal to 10 degrees and smaller than 170 degrees). For example, the processor 220 may determine the state of the electronic device as a first intermediate state, a second intermediate state, a third intermediate state, and/or a fourth intermediate state in response to a range of the folding angle of the display module 160 (for example, larger than or equal to 10 degrees and smaller than 50 degrees, larger than or equal to 50 degrees and smaller than 90 degrees, larger than equal to 90 degrees and smaller than 130 degrees, and/or larger than or equal to 130 degrees and smaller than 170 degrees).

The processor 220 according to an embodiment may identify whether a case is attached to the electronic device 200 and/or a type of the case.

For example, the sensor module 276 and/or the communication module 190 may acquire information related to the case attached to the electronic device 200. For example, the sensor module 276 and/or the communication module 190 may acquire information related to the case, such as whether the case is attached and the case type, based on a signal acquired from the case attached to the electronic device 200. According to an embodiment of the disclosure, the communication module 190 may acquire information related to the case, such as whether the case is attached and the case type, based on a communication signal (for example, short-range communication, such as RFID communication or NFC) acquired from the case attached to the electronic device 200.

For example, the processor 220 may identify the type (for example, material, such as silicon, rubber, or metal or elements (for example, LED) included in the case) of the case attached to the electronic device 220 by using information related to the case attached to the electronic device 200 acquired from the sensor module 276.

The processor 220 according to an embodiment may identify an execution state of a specific application. For example, the specific application may be an application based on augmented reality like displaying information related to an external object on a screen captured by a camera in an overlay method. For example, the specific application may be an application for determining a location of the external object, based on an angle of arrival (AoA) calculated based on a signal transmitted by the external electronic device and rendering and displaying the location of the external object on the screen captured by the camera.

The processor 220 according to an embodiment may identify antenna being used among a plurality of antennas. For example, the processor 220 may identify at least one antenna used for UWB communication among the plurality of antennas included in the UWB module 290. For example, the processor 220 may identify information related to at least one antenna (for example, the location, type, or size of the antenna) used for an AoA function.

According to various embodiments of the disclosure, the processor 220 may acquire a calibration value corresponding to the state of the electronic device 200 in operation 330.

According to an embodiment of the disclosure, the processor 220 may acquire a default calibration value in response to non-existence of the calibration value corresponding to the state of the electronic device 200 in the memory 230.

According to an embodiment of the disclosure, the processor 220 may acquire the calibration value corresponding to the state of the electronic device 200 from the memory 230.

According to an embodiment of the disclosure, the processor 220 may acquire a lookup table of the calibration value corresponding to the state of the electronic device 200 from the memory 230. For example, the processor 220 may select a lookup table corresponding to the state of the electronic device 200 from among a plurality of lookup tables and acquire a calibration value included in the selected lookup table. The example, the processor 220 may acquire a lookup table of a calibration value corresponding to the state of the electronic device 200 including the position of the electronic device 200, the charging state, the folding state, whether the case is attached to the electronic device 200, a type of the case attached to the electronic device 200, an execution state of a specific application, and/or a state in which a specific antenna is being used. For example, the lookup table may be stored according to the state of the electronic device 200 and may include a first calibration value and/or a second calibration value corresponding to a target angle section.

For example, the processor 220 may acquire a lookup table including the first calibration value and/or the second calibration value according to a target angle section corresponding to the folded state in accordance with the folded state of the electronic device 200. For example, the processor 220 may acquire the lookup table including the first calibration value and/or the second calibration value according to a target angle section corresponding to the unfolded state in accordance with the unfolded state of the electronic device 200. For example, the processor 220 may acquire the lookup table including the first calibration value and/or the second calibration value according to a target angle section corresponding to the intermediate state in accordance with the intermediate state of the electronic device 200. For example, the processor 220 may acquire the lookup table including the first calibration value and/or the second calibration value according to a target angle section corresponding to the state in which the case is attached in accordance with the state in which the case is attached to the electronic device 200. For example, the processor 220 may acquire the lookup table including the first calibration value and/or the second calibration value according to a target angle section corresponding to the state in which the case is not attached in accordance with the state in which the case is not attached to the electronic device 200. For example, the processor 220 may acquire the lookup table including the first calibration value and/or the second calibration value according to a target angle section corresponding to the type of the attached case in accordance with a specific type of the case attached to the electronic device 200. For example, the processor 220 may acquire the lookup table including the first calibration value and/or the second calibration value according to a target angle section corresponding to the execution state of a specific application in accordance with the state in which the specific application is executed in the electronic device 200. For example, the processor 220 may acquire the lookup table including the first calibration value and/or the second calibration value according to a target angle section corresponding to the state in which specific antennas (for example, the first antenna and the second antenna) are being used in accordance with the state in which the electronic device 200 are using the specific antennas (for example, the first antenna and the second antenna). For example, the processor 220 may acquire the lookup table including the first calibration value and/or the second calibration value according to a target angle section corresponding to the state in which specific antennas (for example, a third antenna and a fifth antenna) are being used in accordance with the state in which the electronic device 200 are using the specific antennas (for example, the third antenna and the fifth antenna).

According to an embodiment of the disclosure, the processor 220 may select a calibration value with reference to a lookup table corresponding to two or more states of the electronic device 200. For example, when the state of the electronic device 200 is the folded state and the case is attached thereto, the processor 220 may refer to a lookup table including a first calibration value and/or a second calibration value which can be used in the folded state and a lookup table including a first calibration value and/or a second calibration value which can be used in the state in which the case is attached. In another example, when the state of the electronic device 200 is the folded state and the case is attached thereto, the processor 220 may refer to a lookup table including a first calibration value and/or a second calibration value which can be used in the folded state and the state in which the case is attached.

According to various embodiments of the disclosure, the processor 220 may determine an angle of arrival, based on the PDoA and the calibration value in operation 340.

According to an embodiment of the disclosure, the processor 220 may acquire a first calibration value and/or a second calibration value corresponding to the determined target angle section in the lookup table of the calibration value corresponding to the state of the electronic device 200. According to an embodiment of the disclosure, the processor 220 may determine the angle of arrival ($\alpha$) by putting the first calibration value into d of Equation 1 and the second calibration value into $\Delta\Phi$.

Figure 3B:
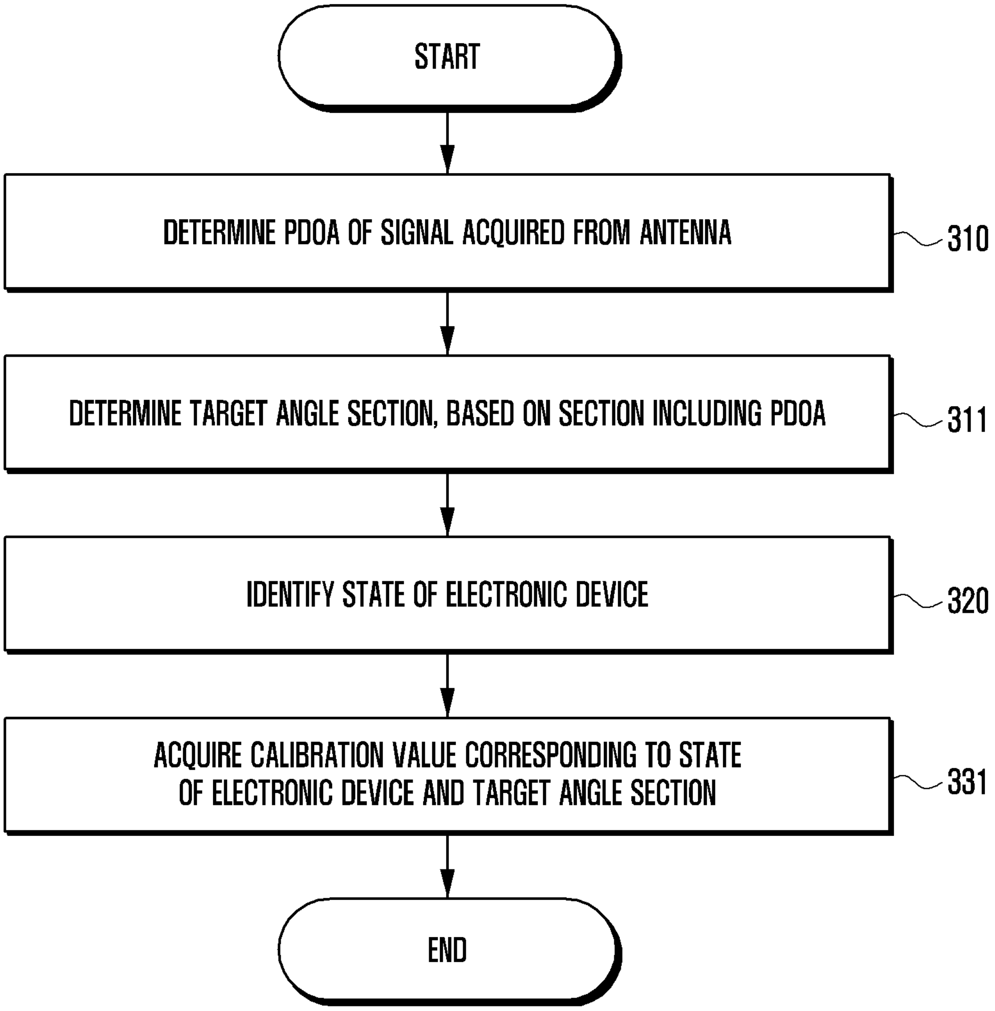
FIGS. 3B and 3C are a flowchart illustrating a method by which a processor acquires a calibration value corresponding to a state of an electronic device and a target angle section according to various embodiments of the disclosure.

FIG. 3B is a flowchart illustrating a method by which a processor acquires a calibration value corresponding to a state of an electronic device and a target angle section according to an embodiment of the disclosure.

Referring to FIG. 3B, according to various embodiments of the disclosure, the processor 220 may acquire a signal from an antenna and determine a phase difference of arrival (PDoA) in operation 310.

According to various embodiments of the disclosure, the processor 220 may determine a target angle section, based on a section including the PDoA in operation 311.

According to an embodiment of the disclosure, the processor 220 may determine the target angle section, based on the PDoA. For example, the processor 220 may determine the section of the target angle corresponding to inclusion of the PDoA in a predetermined range. For example, the processor 220 may determine a first target angle section (for example, −90 degrees to −60 degrees) in response to inclusion of the PDoA in a first phase difference section (for example, −180 degrees to −140 degrees). For example, the processor 220 may determine a second target angle section (for example, −60 degrees to −20 degrees) in response to inclusion of the PDoA in a second phase difference section (for example, −140 degrees to −40 degrees). For example, the processor 220 may determine a third target angle section (for example, −20 degrees to 20 degrees) in response to inclusion of the PDoA in a third phase difference section (for example, −40 degrees to 40 degrees). For example, the processor 220 may determine a fourth target angle section (for example, 20 degrees to 60 degrees) in response to inclusion of the PDoA in a fourth phase difference section (for example, 40 degrees to 140 degrees). For example, the processor 220 may determine a fifth target angle section (for example, 60 degrees to 90 degrees) in response to inclusion of the PDoA in a fifth phase difference section (for example, 140 degrees to 180 degrees).

According to various embodiments of the disclosure, the processor 220 may identify information related to the state of the electronic device 200 in operation 320.

According to various embodiments of the disclosure, the processor 220 may acquire a calibration value corresponding to the state of the electronic device 200 and the target angle section in operation 331.

According to an embodiment of the disclosure, the processor 220 may acquire a lookup table of the calibration value corresponding to the state of the electronic device 200 from the memory 230. For example, the processor 220 may select a lookup table corresponding to the state of the electronic device from among a plurality of lookup tables and acquire a calibration value included in the selected lookup table. The example, the processor 220 may acquire a lookup table of a calibration value corresponding to the state of the electronic device 200 including the position of the electronic device 200, the charging state, the folding state, whether the case is attached to the electronic device 200, a type of the case attached to the electronic device 200, an execution state of a specific application, and/or a state in which a specific antenna is being used. For example, the lookup table may be stored according to the state of the electronic device 200 and may include a first correction value and/or a second calibration value corresponding to a target angle section.

According to an embodiment of the disclosure, the processor 220 may acquire a calibration value corresponding to the target angle section determined in operation 311 from the lookup table of the calibration value corresponding to the state of the electronic device 200. For example, the processor 220 may include a first calibration value and/or a second calibration value corresponding to the first target angle section in the lookup table. For example, the processor 220 may include a first calibration value and/or a second calibration value corresponding to the second target angle section in the lookup table. For example, the processor 220 may include a first calibration value and/or a second calibration value corresponding to the third target angle section in the lookup table. For example, the processor 220 may include a first calibration value and/or a second calibration value corresponding to the fourth target angle section in the lookup table. For example, the processor 220 may include a first calibration value and/or a second calibration value corresponding to the fifth target angle section in the lookup table.

Figure 3C:
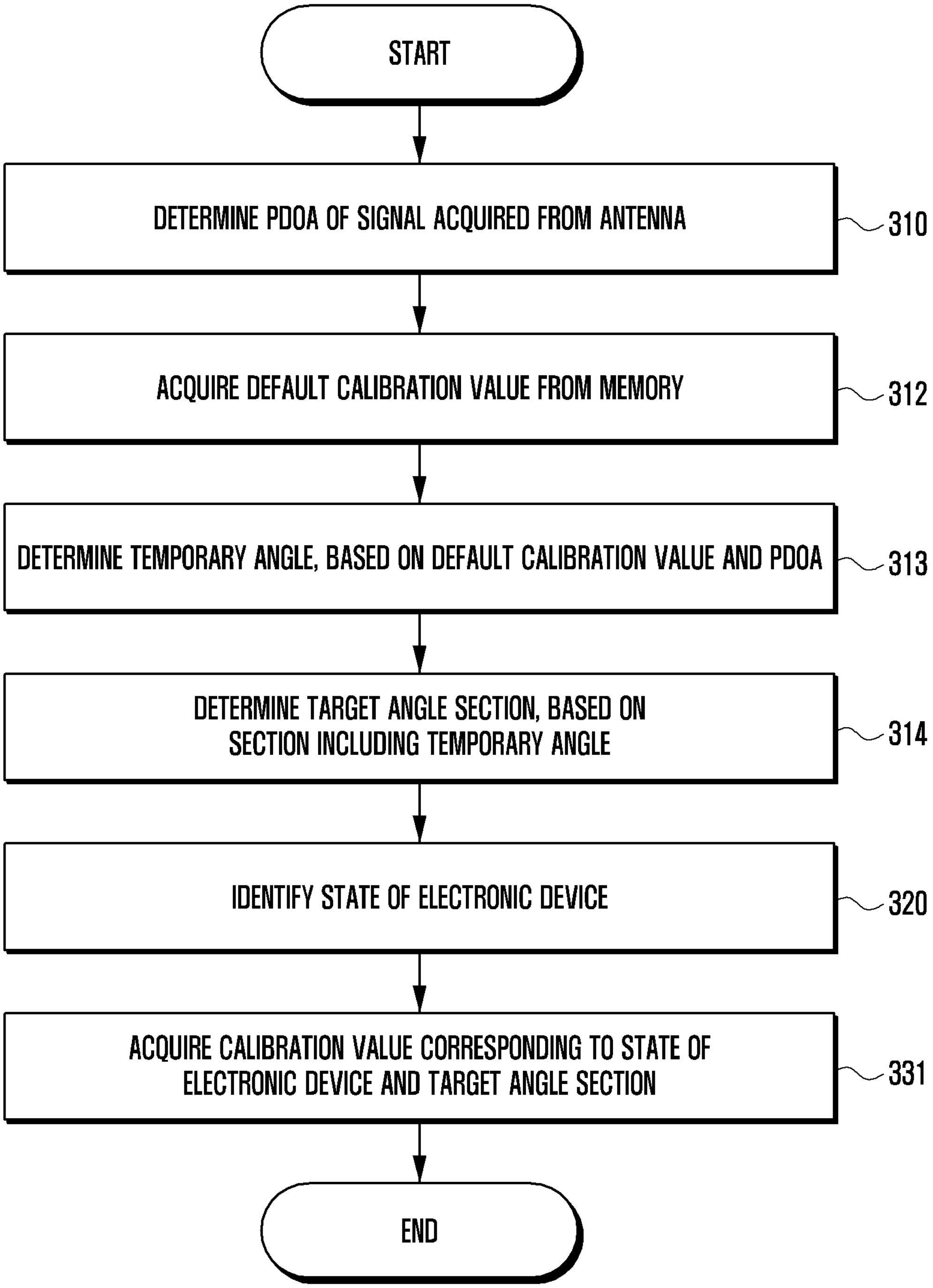

FIG. 3C is a flowchart illustrating a method by which a processor acquires a calibration value corresponding to a state of an electronic device and a target angle section according to an embodiment of the disclosure.

Referring to FIG. 3C, according to various embodiments of the disclosure, the processor 220 may acquire a signal from an antenna and determine a phase difference of arrival (PDoA) in operation 310.

According to various embodiments of the disclosure, the processor 220 may acquire a default calibration value from the memory 230 in operation 312.

According to various embodiments of the disclosure, the processor 220 may determine a temporary angle of arrival, based on the default calibration value and the PDoA in operation 313.

For example, the processor 220 may determine the temporary angle of arrival by inputting the default calibration value stored in the memory 230 into Equation 1.

According to various embodiments of the disclosure, the processor 220 may determine a target angle section, based on the temporary angle of arrival (AoA) in operation 314.

For example, the processor 220 may determine the target angle section corresponding to inclusion of the temporary AoA in a predetermined range. For example, the processor 220 may determine a section including the temporary AoA as the section of the target angle among a first target angle section (for example, −90 degrees to −60 degrees), a second target angle section (for example, −60 degrees to −20 degrees), a third target angle section (for example, −20 degrees to 20 degrees), a fourth target angle section (for example, 20 degrees to 60 degrees), and/or a fifth target angle section (for example, 60 degrees to 90 degrees).

According to various embodiments of the disclosure, the processor 220 may identify information related to the state of the electronic device 200 in operation 320.

According to various embodiments of the disclosure, the processor 220 may acquire a calibration value corresponding to the state of the electronic device 200 and the target angle section in operation 331.

Figure 4A:
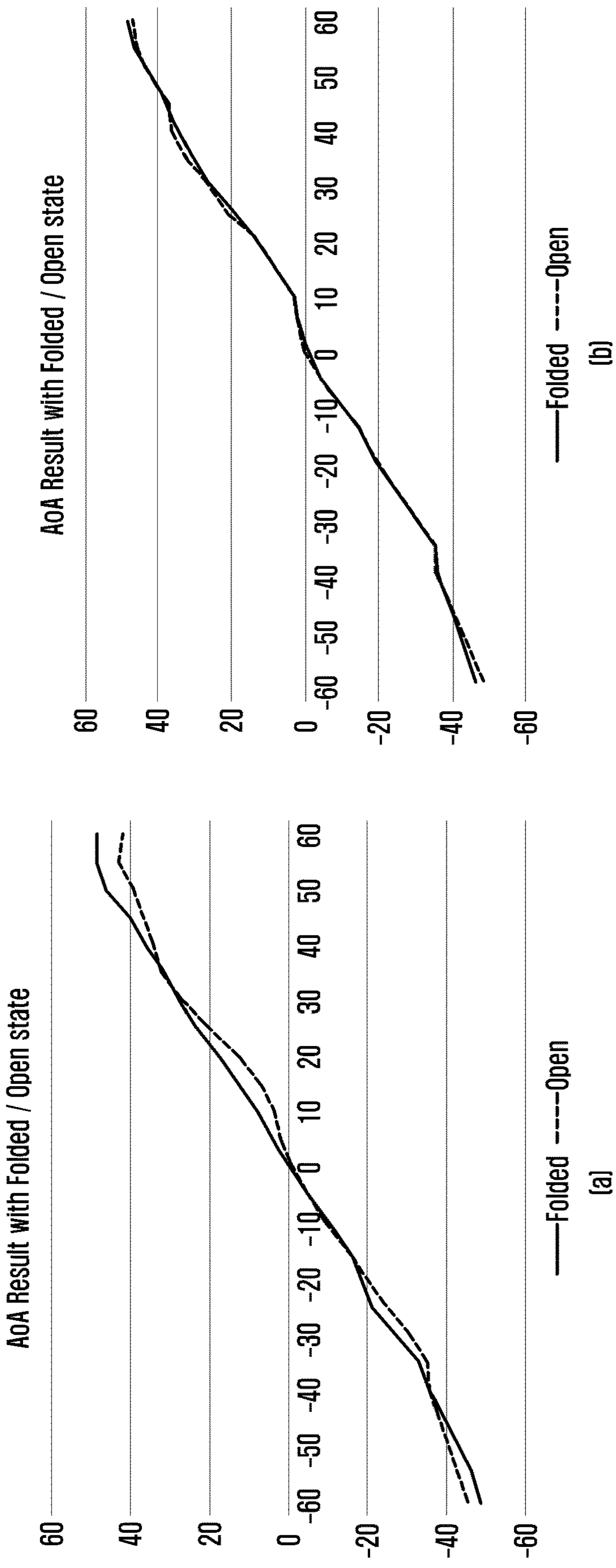
FIGS. 4A and 4B illustrate comparison between experience data in a case in which a processor determines an angle of arrival by using a fixed calibration value and experience data in a case in which a processor determines an angle of arrival by using a calibration value corresponding to a state of an electronic device according to various embodiments of the disclosure.
Figure 4B:
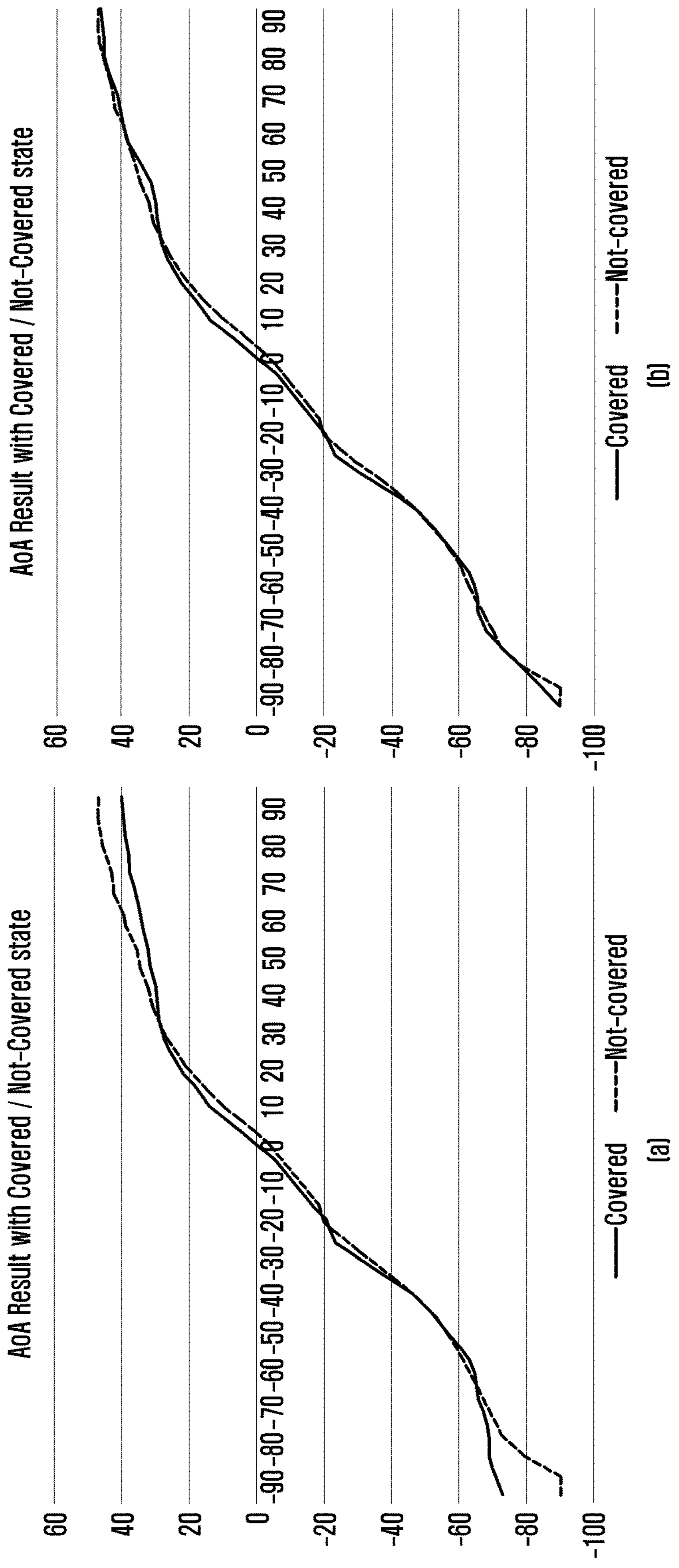

FIGS. 4A and 4B illustrate comparison between experience data in a case in which a processor determines an angle of arrival by using a fixed calibration value and experience data in a case in which a processor determines an angle of arrival by using a calibration value corresponding to a state of an electronic device according to various embodiments of the disclosure. According to an embodiment of the disclosure, in each graph, the x axis may be a target angle and a y axis may be an angle of arrival (AoA) determined by the processor 220. According to an embodiment of the disclosure, the accuracy of the determined angle of arrival may be increased according to a matching degree between the target angle and the angle of arrival.

Referring to FIG. 4A, it illustrates comparison between experience data in the case in which the processor 220 determines an angle of arrival by using a fixed calibration value and experience data in the case in which the processor 220 determines an angle of arrival by using a calibration value corresponding to the state of the electronic device 200 in a folded state or an open state of the electronic device 200.

Referring to part (a) of FIG. 4A illustrates an angle of arrival (AoA result) according to a target angle section in the folded state or the opened state of the electronic device 200 when the processor 220 determines the angle of arrival by using the fixed calibration value. Referring to part (a) of FIG. 4A, it may be noted that there is difference between the graph in the folded state and the graph in the opened state in a section of the target angle from −40 degrees to −20 degrees, a section of the target angle from 5 degrees to 30 degrees, and a section of the target angle from 45 degrees to 60 degrees.

Referring to part (b) of FIG. 4A illustrates an angle of arrival (AoA result) according to a target angle section in the folded state or the opened state of the electronic device 200 when the processor 220 determines the angle of arrival by using the calibration value corresponding to the state of the electronic device 200. Referring to part (b) of FIG. 4A, it may be noted that the graph in the folded state and the graph in the opened state are similar in the entire sections.

FIG. 4B illustrates comparison between experience data in a case which a processor according to various embodiments determines an angle of arrival by using a fixed calibration value and experience data in a case in which a processor determines an angle of arrival by using a calibration value corresponding to a state of an electronic device in a state (covered) in which a case is attached to an electronic device or a state (not-covered) in which a case is not attached.

Referring to part (a) of FIG. 4B illustrates an angle of arrival (AoA result) according to a target angle section in the state (covered) in which the case is attached to the electronic device 200 or the state (not-covered) in which the case is not attached when the processor 220 determines the angle of arrival by using the fixed calibration value. Referring to part (a) of FIG. 4A, it may be noted that there is difference between the graph of the state (covered) in which the case is attached and the graph of the state (not-covered) in which the case is not attached in a section of the target angle from −90 degrees to −70 degrees and a second of the target angle from 40 degrees to 90 degrees.

Referring to part (b) of FIG. 4B illustrates an angle of arrival (AoA result) according to a target angle section in the state (covered) in which the case is attached to the electronic device 200 or the state (not-covered) in which the case is not attached when the processor 220 determines the angle of arrival by using the calibration value corresponding to the state of the electronic device 200. Referring to part (b) of FIG. 4B, it may be noted that the graph in the state (covered) in which the case is attached and the graph in the state (not-covered) in which the case is not attached are similar in the entire sections.

Figure 5:
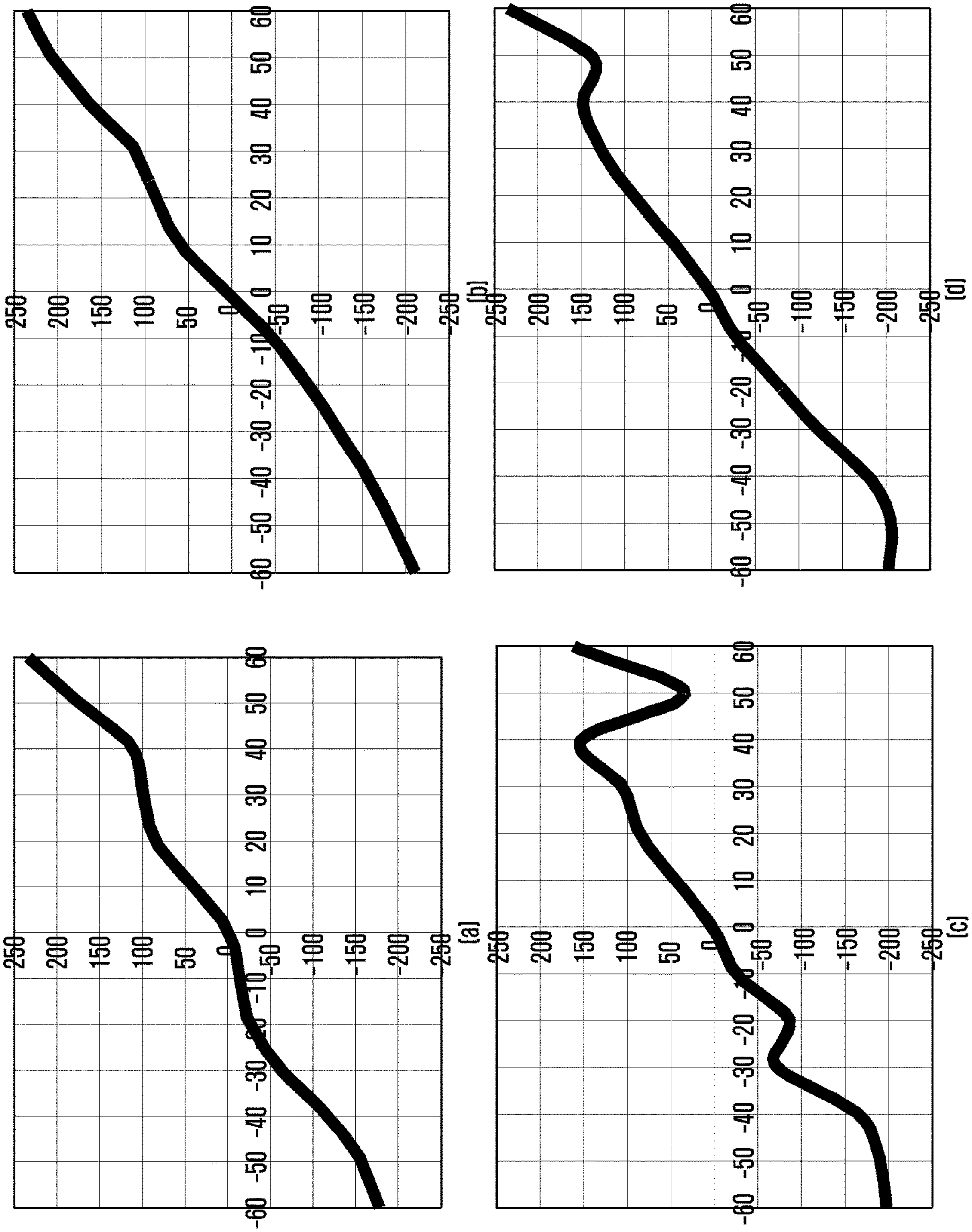
FIG. 5 illustrates experience data according to a type of a case attached to an electronic device when a processor determines an angle of arrival by using a fixed calibration value according to an embodiment of the disclosure.

FIG. 5 illustrates experience data according to a type of a case attached to an electronic device when a processor determines an angle of arrival by using a fixed calibration value according to an embodiment of the disclosure. According to an embodiment of the disclosure, in the graph, the x axis may be a target angle and the y axis may be an angle of arrival (AoA) determined by the processor 220.

Referring to part (a) of FIG. 5 may be a graph showing an angle of arrival according to a target angle section when the processor 220 determines the angle of arrival by using a fixed calibration value in the case in which a case attached to the electronic device 200 is silicon.

Referring to part (b) of FIG. 5 may be a graph showing an angle of arrival according to a target angle section when the processor 220 determines the angle of arrival by using a fixed calibration value in the case in which a case attached to the electronic device 200 is rubber.

Referring to part (c) of FIG. 5 may be a graph showing an angle of arrival according to a target angle section when the processor 220 determines the angle of arrival by using a fixed calibration value in the case in which a case attached to the electronic device 200 includes an LED.

Referring to part (d) of FIG. 5 may be a graph showing an angle of arrival according to a target angle section when the processor 220 determines the angle of arrival by using a fixed calibration value in the case in which a case attached to the electronic device 200 is metal.

Referring to parts (a) to (d) of FIG. 5, it may be noted that the graph of the angle of arrival varies depending on the target angle section according to the case attached to the electronic device 200. The processor 220 may need to differently configure a calibration value corresponding to the attached case in order to improve the accuracy of the determined angle of arrival.

Figure 6:
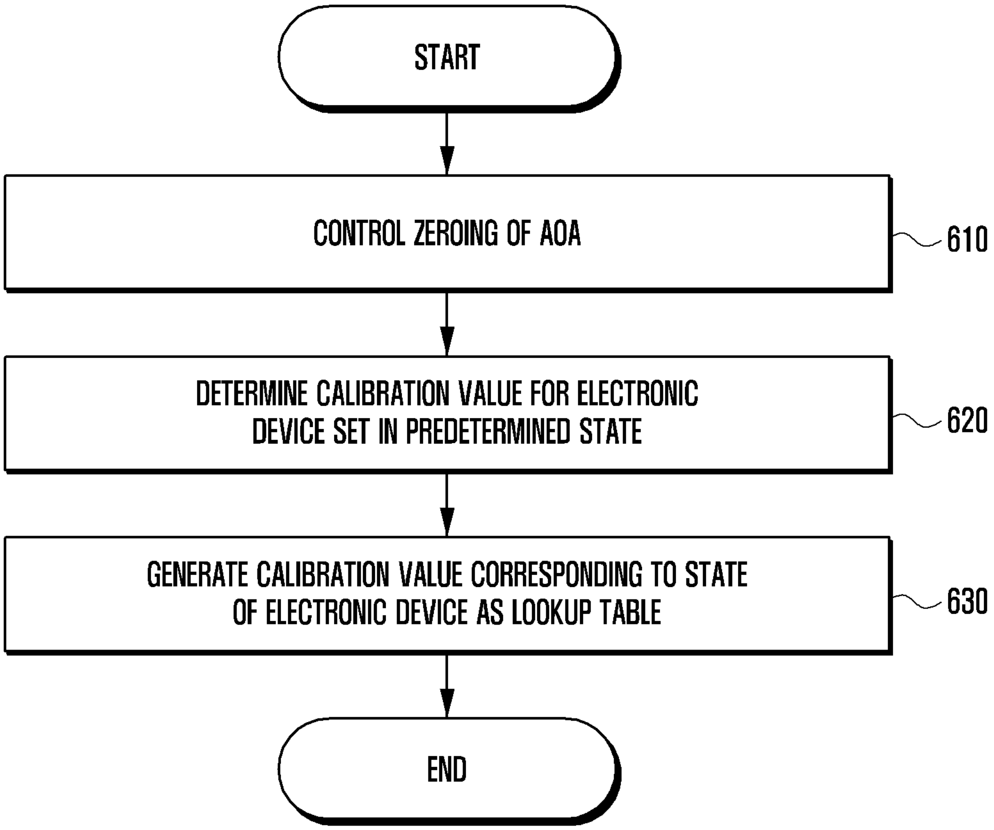
FIG. 6 is a flowchart illustrating a method by which a processor generates a lookup table according to an embodiment of the disclosure.

FIG. 6 is a flowchart illustrating a method by which a processor generates a lookup table according to an embodiment of the disclosure.

Referring to FIG. 6, the lookup table described in this document includes all embodiments of storing data and loading necessary data and is not limited to a lookup table format itself.

The processor 220 according to various embodiments may configure a calibration value for obtaining an angle of arrival from a phase difference of arrival of an external signal in operation 610.

According to an embodiment of the disclosure, the processor 220 may determine a calibration value having an angle of arrival (AoA) of 0 degrees as a default calibration value in accordance with a phase difference of arrival (PDoA) of 0 degrees. For example, the processor 220 may determine that a first calibration value is a predetermined value (for example, d=20 mm) and a second calibration value is another predetermined value (for example, $\Delta\Phi=0$).

According to an embodiment of the disclosure, the processor 220 may store the determined default calibration value in the memory (For example, the memory 230 of FIG. 2) and configure the same in firmware or middleware of the UWB module 290.

The processor 220 according to various embodiments may determine a calibration value corresponding to an electronic device (for example, the electronic device 200 of FIG. 2) set in a predetermined state in operation 620.

According to an embodiment of the disclosure, the processor 220 may determine a calibration value corresponding to a state in which the electronic device 200 is folded, a state in which the electronic device 200 is unfolded, a state set in a predetermined position, a charging state, a state in which a case is attached to the electronic device 200, a state in which no case is attached to the electronic device 200, a type of the case attached to the electronic device 200, a state in which a specific application is executed, and/or a state including a state in which a specific antenna is being used.

According to an embodiment of the disclosure, the processor 220 may classify the target angle for the electronic device 200 set in the predetermined state and determine the calibration value. For example, the processor 220 may classify a range of the target angle from −90 degrees to 90 degrees as a predetermined section and determine a calibration value corresponding to each section. For example, the processor 220 may divide the target angle into a first target angle section (for example, −90 degrees to −60 degrees), a second target angle section (for example, −60 degrees to −20 degrees), a third target angle section (for example, −20 degrees to 20 degrees), a fourth target angle section (for example, 20 degrees to 60 degrees), and/or a fifth target angle section (for example, 60 degrees to 90 degrees).

For example, the processor 220 may receive a signal corresponding to the target angle section from an external electronic device located at the target angle from the electronic device 200 set in a predetermined state and determine, as the calibration value, an angle of arrival determined according to the received signal having a matching degree larger than or equal to a predetermined value with the target angle.

For example, the processor 220 may determine the calibration value according to a linear circuit equation using a PDoA measured in each section of the target angle and an AoA ground truth for the electronic device 200 set in a predetermined state.

The processor 220 according to various embodiments of the disclosure may generate a lookup table using the calibration value corresponding to the state of the electronic device 200 in operation 630.

According to an embodiment of the disclosure, the processor 220 may generate a calibration value corresponding to a target angle section for each state of the electronic device 200 in the form of a lookup table. For example, the processor 220 may generate a calibration value corresponding to each of the first target angle section of the target angle, the second target angle section, the third target angle section, the fourth target angle section, and/or the fifth target angle section as a first state lookup table in response to a first state of the electronic device 200.

According to an embodiment of the disclosure, the processor 220 may store lookup tables of calibration values, such as a first state lookup table and a second state lookup table for each state of the electronic device 200 in the memory 230. For example, the lookup tables of the calibration values, such as the first state lookup table and the second state lookup table stored in the memory 230 for each state of the electronic device 200 may be values configured by a manufacturer.

According to an embodiment of the disclosure, the processor 220 may learn one or more calibration value data to generate lookup tables of the calibration values. According to an embodiment of the disclosure, the processor 220 may acquire a lookup table of a calibration value from a server and store the same in the memory 230. According to an embodiment of the disclosure, the processor 220 may acquire a lookup table of a calibration value from an external electronic device and store the same in the memory 230. According to an embodiment of the disclosure, the processor 220 may update the lookup table of the calibration value to the server.

Figure 7A:
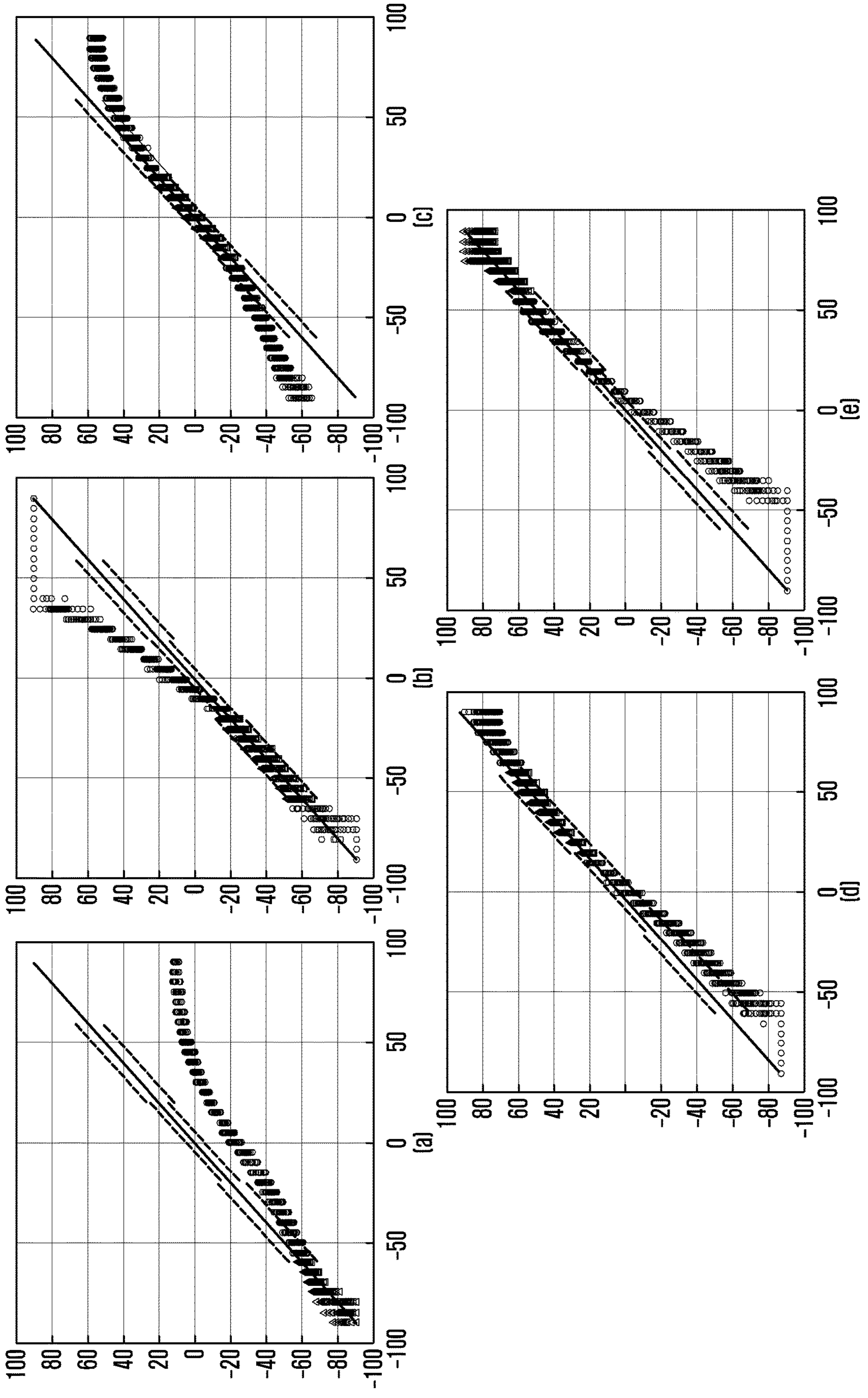
FIGS. 7A, 7B, 7C, and 7D illustrate experience data related to calibration values determined by a processor, based on a state of an electronic device according to various embodiments of the disclosure.

FIGS. 7A., 7B, 7C, and 7D illustrate experience data related to calibration values determined by a processor, based on a state of an electronic device according to various embodiments of the disclosure. According to an embodiment of the disclosure, in each graph, the x axis may be a target angle and a y axis may be an angle of arrival determined by the processor 220.

Referring to FIG. 7A, it illustrates experience data for determining a calibration value in each section after dividing the target angle into a first target angle section, a second target angle section, a third target angle section, a fourth target angle section, and/or a fifth target angle section in response to determination by the processor 220 that the state of the electronic device 200 is a folded state. The diagonal line included in each graph of FIG. 7A is the reference line, the dotted line is the margin of error allowable from the reference line, experience data located within the dotted line is illustrated as Δ, and experience data spaced apart from the reference line by a predetermined distance is illustrated as ○.

For example, the data expressed as Δ may have the accuracy larger than or equal to a predetermined value, and the data expressed as ○ may have accuracy smaller than the predetermined value.

Table 1 may be a lookup table applied to each graph of FIG. 7A.

TABLE 1

| Graph | Section | Target angle | First calibration value (d) | Second calibration value (ΔΦ) |
|---|---|---|---|---|
| (a) | First target angle section | −90°~−60° | 23 mm | 90° |
| (b) | Second target angle section | −60°~−20° | 11 mm | −18° |
| (c) | Third target angle section | −20°~20° | 17 mm | −1° |
| (d) | Fourth target angle section | 20°~60° | 13 mm | 15° |
| (e) | Fifth target angle section | 60°~90° | 12 mm | 21° |

Referring to part (a) of FIG. 7A is a graph illustrating an angle of arrival corresponding to a target angle section in a first target angle section (for example, −90 degrees to −60 degrees) when the electronic device 200 is in the folded state, the first calibration value (d) is 23 mm, and the second calibration value (ΔΦ) is 90 degrees. Referring to part (a) of FIG. 7A, in response to determination that the first calibration value (d) is 23 mm and the second calibration value (ΔΦ) is 90 degrees, it may be noted that the accuracy of data on the angle of arrival in the first target angle section is larger than or equal to a predetermined value (Δ).

Referring to part (b) of FIG. 7A is a graph illustrating an angle of arrival corresponding to a target angle section in a second target angle section (for example, −60 degrees to −20 degrees) when the electronic device 200 is in the folded state, the first calibration value (d) is 11 mm, and the second calibration value (d) is −18 degrees. Referring to part (b) of FIG. 7A, in response to determination that the first calibration value (d) is 11 mm and the second calibration value (ΔΦ) is −18 degrees, it may be noted that the accuracy of data on the angle of arrival in the second target angle section is larger than or equal to the predetermined value (Δ).

Referring to part (c) of FIG. 7A is a graph illustrating an angle of arrival corresponding to a target angle section in a third target angle section (for example, −20 degrees to 20 degrees) when the electronic device 200 is in the folded state, the first calibration value (d) is 17 mm, and the second calibration value (ΔΦ) is −1 degrees. Referring to part (c) of FIG. 7A, in response to determination that the first calibration value (d) is 17 mm and the second calibration value (ΔΦ) is −1 degrees, it may be noted that the accuracy of data on the angle of arrival in the third target angle section is larger than or equal to the predetermined value (Δ).

Referring to part (d) of FIG. 7A is a graph illustrating an angle of arrival corresponding to a target angle section in a fourth target angle section (for example, 20 degrees to 60 degrees) when the electronic device 200 is in the folded state, the first calibration value (d) is 13 mm, and the second calibration value (ΔΦ) is 15 degrees. Referring to part (d) of FIG. 7A, in response to determination that the first calibration value (d) is 13 mm and the second calibration value (ΔΦ) is 15 degrees, it may be noted that the accuracy of data on the angle of arrival in the fourth target angle section is larger than or equal to the predetermined value (Δ).

Referring to part (e) of FIG. 7A is a graph illustrating an angle of arrival corresponding to a target angle section in a fifth target angle section (for example, 60 degrees to 90 degrees) when the electronic device 200 is in the folded state, the first calibration value (d) is 12 mm, and the second calibration value (ΔΦ) is 21 degrees. Referring to part (e) of FIG. 7A, in response to determination that the first calibration value (d) is 12 mm and the second calibration value (ΔΦ) is 21 degrees, it may be noted that the accuracy of data on the angle of arrival in the fifth target angle section is larger than or equal to the predetermined value (Δ).

Figure 7B:
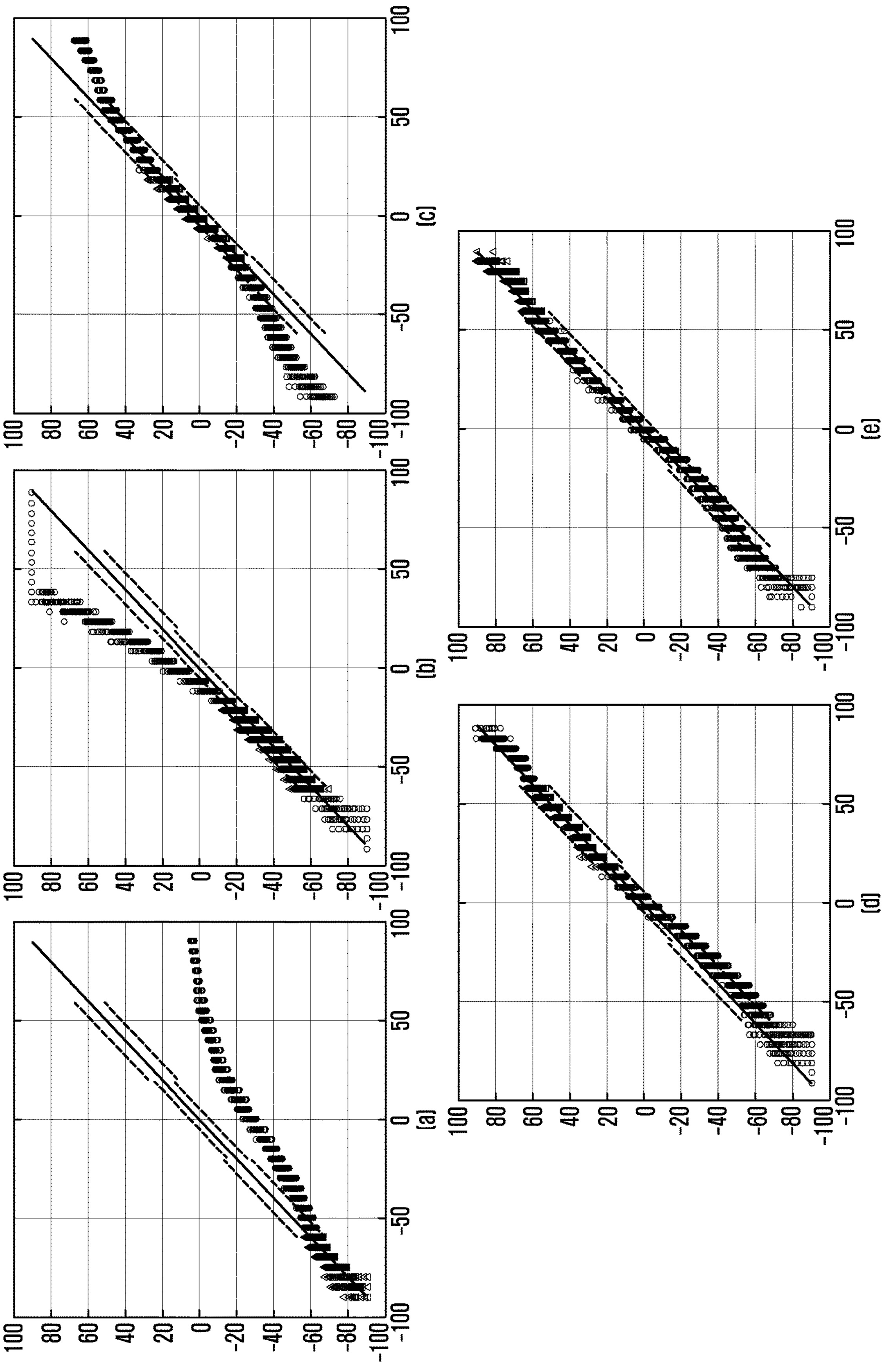

FIG. 7B illustrates experience data for determining a calibration value in each section after dividing a target angle into a first target angle section, a second target angle section, a third target angle section, a fourth target angle section, and/or a fifth target angle section in response to determination by the processor 220 that the state of the electronic device 200 is an unfolded state. The diagonal line included in each graph of FIG. 7B is the reference line, the dotted line is the margin of error allowable from the reference line, experience data located within the dotted line is illustrated as Δ, and experience data spaced apart from the reference line by a predetermined distance is illustrated as ○. For example, the data expressed as Δ may have the accuracy larger than or equal to a predetermined value, and the data expressed as ○ may have accuracy smaller than the predetermined value.

Table 2 may be a lookup table applied to each graph of FIG. 7B.

TABLE 2

| Graph | Section | Target angle | First calibration value (d) | Second calibration value (ΔΦ) |
|---|---|---|---|---|
| (a) | First target angle section | −90°~−60° | 27 mm | 122° |
| (b) | Second target angle section | −60°~−20° | 11 mm | −17° |
| (c) | Third target angle section | −20°~20° | 16 mm | −1° |
| (d) | Fourth target angle section | 20°~60° | 13 mm | 11° |
| (e) | Fifth target angle section | 60°~90° | 14 mm | 3° |

Referring to part (a) of FIG. 7B is a graph illustrating an angle of arrival corresponding to a target angle section in a first target angle section (for example, −90 degrees to −60 degrees) when the electronic device 200 is the unfolded state, the first calibration value (d) is 27 mm, and the second calibration value (ΔΦ) is 122 degrees. Referring to part (a) of FIG. 7A, in response to determination that the first calibration value (d) is 27 mm and the second calibration value (ΔΦ) is 122 degrees, it may be noted that the accuracy of data on the angle of arrival in the first target angle section is larger than or equal to a predetermined value (Δ). Referring to part (b) of FIG. 7B is a graph illustrating an angle of arrival corresponding to a target angle section in a second target angle section (for example, −60 degrees to −20 degrees) when the electronic device 200 is the unfolded state, the first calibration value (d) is 11 mm, and the second calibration value (ΔΦ) is −17 degrees. Referring to part (b) of FIG. 7B, in response to determination that the first calibration value (d) is 11 mm and the second calibration value (ΔΦ) is −17 degrees, it may be noted that the accuracy of data on the angle of arrival in the second target angle section is larger than or equal to the predetermined value (Δ).

Referring to part (c) of FIG. 7B is a graph illustrating an angle of arrival corresponding to a target angle section in a third target angle section (for example, −20 degrees to 20 degrees) when the electronic device 200 is the unfolded state, the first calibration value (d) is 16 mm, and the second calibration value (ΔΦ) is −1 degrees. Referring to part (c) of FIG. 7B, in response to determination that the first calibration value (d) is 16 mm and the second calibration value (ΔΦ) is −1 degrees, it may be noted that the accuracy of data on the angle of arrival in the third target angle section is larger than or equal to the predetermined value (Δ).

Referring to part (d) of FIG. 7B is a graph illustrating an angle of arrival corresponding to a target angle section in a fourth target angle section (for example, 20 degrees to 60 degrees) when the electronic device 200 is the unfolded state, the first calibration value (d) is 13 mm, and the second calibration value (ΔΦ) is 11 degrees. Referring to part (d) of FIG. 7B, in response to determination that the first calibration value (d) is 13 mm and the second calibration value (ΔΦ) is 11 degrees, it may be noted that the accuracy of data on the angle of arrival in the fourth target angle section is larger than or equal to the predetermined value (Δ).

Referring to part (e) of FIG. 7B is a graph illustrating an angle of arrival corresponding to a target angle section in a fifth target angle section (for example, 60 degrees to 90 degrees) when the electronic device 200 is the unfolded state, the first calibration value (d) is 14 mm, and the second calibration value (ΔΦ) is 3 degrees. Referring to part (d) of FIG. 7B, in response to determination that the first calibration value (d) is 14 mm and the second calibration value (ΔΦ) is 3 degrees, it may be noted that the accuracy of data on the angle of arrival in the fifth target angle section is larger than or equal to the predetermined value (Δ).

The electronic device 200 according to an embodiment may include a lookup table including a first calibration value and/or a second calibration value which can be used in an intermediate state (for example, a first intermediate state to a fourth intermediate state) between the unfolded state and the folded state. For example, when the electronic device 200 is in an intermediate state, the processor 220 may acquire a lookup table corresponding to the intermediate state. When the electronic device 200 is in the intermediate state (for example, the first intermediate state to the fourth intermediate state) between the unfolded state and the folded state, the electronic device 200 according to an embodiment may use a lookup table corresponding to the unfolded state or a lookup table corresponding to the folded state. For example, the processor 220 may use the lookup table corresponding to the unfolded state when the electronic device 200 switches from the unfolded state to the intermediate state, and use the lookup table corresponding to the folded state when the electronic device 200 switches from the folded state to the intermediate state.

Figure 7C:
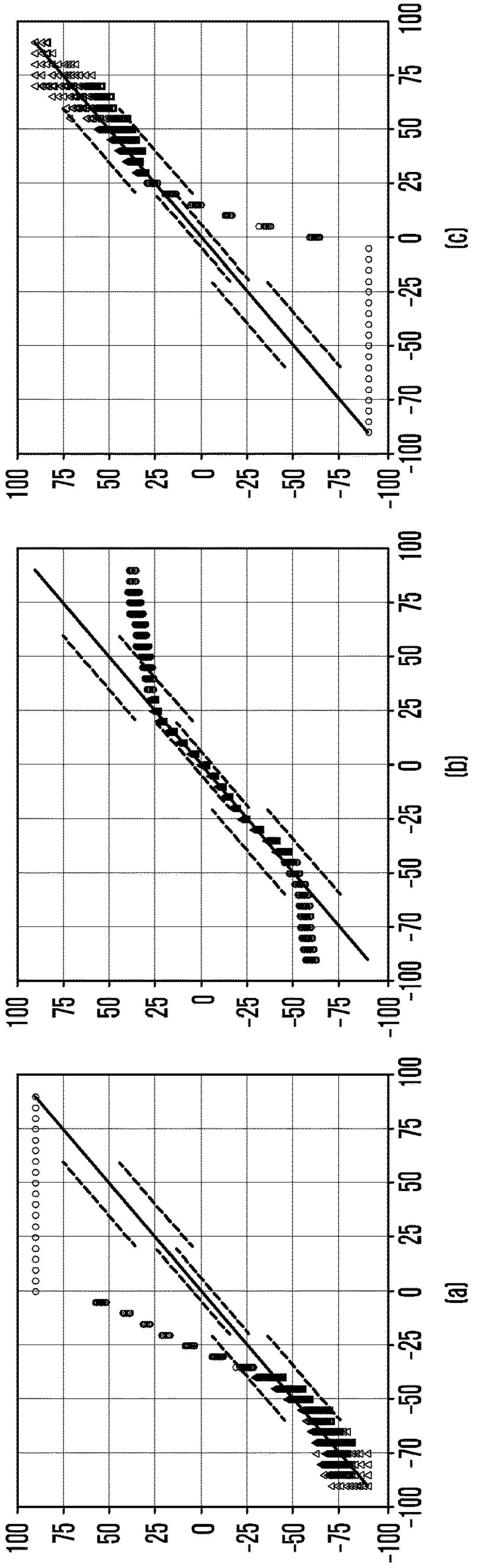

FIG. 7C illustrates experience data for determining a calibration value in each section after dividing the target angle into a first target angle section, a second target angle section, and/or a third target angle section in response to determination by the processor 220 that the state of the electronic device 200 is a state (covered) in which the case is attached. The diagonal line included in each graph of FIG. 7C is the reference line, the dotted line is the margin of error allowable from the reference line, experience data located within the dotted line is illustrated as Δ, and experience data spaced apart from the reference line by a predetermined distance is illustrated as ○. For example, the data expressed as Δ may have the accuracy larger than or equal to a predetermined value, and the data expressed as ○ may have accuracy smaller than the predetermined value.

Table 3 may be a lookup table applied to each graph of FIG. 7C.

TABLE 3

| Graph | Section | Target angle | First calibration value (d) | Second calibration value (ΔΦ) |
|---|---|---|---|---|
| (a) | First target angle section | −90°~−40° | 6 mm | −55.9° |
| (b) | Second target angle section | −40°~30° | 16 mm | 15.19° |
| (c) | Third target angle section | 30°~90° | 5 mm | 58.24° |

Referring to part (a) of FIG. 7C is a graph illustrating an angle of arrival corresponding to a target angle section in a first target angle section (for example, −90 degrees to −40 degrees) when the electronic device 200 is in a state (covered) in which the case is attached, the first calibration value (d) is 6 mm, and the second calibration value) is −55.9 degrees. Referring to part (a) of FIG. 7C, in response to determination that the first calibration value (d) is 6 mm and the second calibration value (ΔΦ) is −55.9 degrees, it may be noted that the accuracy of data on the angle of arrival in the first target angle section is larger than or equal to a predetermined value (Δ). Referring to part (b) of FIG. 7C is a graph illustrating an angle of arrival corresponding to a target angle section in a second target angle section (for example, −40 degrees to 30 degrees) when the electronic device 200 is in a state (covered) in which the case is attached, the first calibration value (d) is 16 mm, and the second calibration value) is 15.19 degrees. Referring to part (b) of FIG. 7C, in response to determination that the first calibration value (d) is 16 mm and the second calibration value (ΔΦ) is 15.19 degrees, it may be noted that the accuracy of data on the angle of arrival in the second target angle section is larger than or equal to the predetermined value (Δ). Referring to part (c) of FIG. 7C is a graph illustrating an angle of arrival corresponding to a target angle section in a third target angle section (for example, 30 degrees to 90 degrees) when the electronic device 200 is in a state (covered) in which the case is attached, the first calibration value (d) is 5 mm, and the second calibration value (ΔΦ) is 58.24 degrees. Referring to part (c) of FIG. 7C, in response to determination that the first calibration value (d) is 5 mm and the second calibration value (ΔΦ) is 58.24 degrees, it may be noted that the accuracy of data on the angle of arrival in the third target angle section is larger than or equal to the predetermined value (Δ).

Figure 7D:
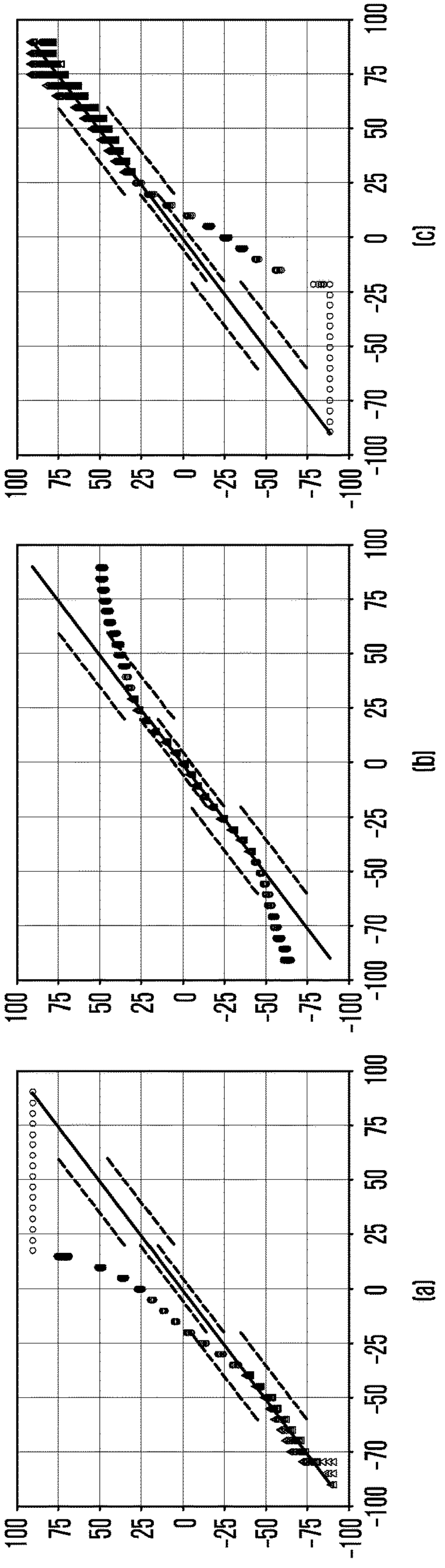

FIG. 7D illustrates experience data for determining a calibration value in each section after dividing the target angle into a first target angle section, a second target angle section, a third target angle section, a fourth target angle section, and/or a fifth target angle section in response to determination by the processor 220 that the state of the electronic device 200 is a state (not-covered) in which no case is attached. The diagonal line included in each graph of FIG. 7D is the reference line, the dotted line is the margin of error allowable from the reference line, experience data located within the dotted line is illustrated as Δ, and experience data spaced apart from the reference line by a predetermined distance is illustrated as ○. For example, the data expressed as A may have the accuracy larger than or equal to a predetermined value, and the data expressed as ○ may have accuracy smaller than the predetermined value.

Table 4 may be a lookup table applied to each graph of FIG. 7D.

TABLE 4

| Graph | Section | Target angle | First calibration value (d) | Second calibration value (ΔΦ) |
|---|---|---|---|---|
| (a) | First target angle section | −90°~−40° | 9 mm | −34.7° |
| (b) | Second target angle section | −40°~30° | 16 mm | 9.94° |
| (c) | Third target angle section | 30°~90° | 8 mm | 43.04° |

Referring to part (a) of FIG. 7D is a graph illustrating an angle of arrival corresponding to a target angle section in a first target angle section (for example, −90 degrees to −40 degrees) when the electronic device 200 is in a state (not-covered) in which no case is attached, the first calibration value (d) is 9 mm, and the second calibration value (ΔΦ) is −34.7 degrees. Referring to part (a) of FIG. 7D, in response to determination that the first calibration value (d) is 9 mm and the second calibration value (ΔΦ) is −34.7 degrees, it may be noted that the accuracy of data on the angle of arrival in the first target angle section is larger than or equal to a predetermined value (Δ). Referring to part (b) of FIG. 7D is a graph illustrating an angle of arrival corresponding to a target angle section in a second target angle section (for example, −40 degrees to 30 degrees) when the electronic device 200 is in a state (not-covered) in which no case is attached, the first calibration value (d) is 16 mm, and the second calibration value (ΔΦ) is 9.94 degrees. Referring to part (b) of FIG. 7D, in response to determination that the first calibration value (d) is 16 mm and the second calibration value (ΔΦ) is 9.94 degrees, it may be noted that the accuracy of data on the angle of arrival in the second target angle section is larger than or equal to the predetermined value (Δ). Referring to part (c) of FIG. 7D is a graph illustrating an angle of arrival corresponding to a target angle section in a third target angle section (for example, 30 degrees to 90 degrees) when the electronic device 200 is in a state (not-covered) in which no case is attached, the first calibration value (d) is 8 mm, and the second calibration value (ΔΦ) is 43.04 degrees. Referring to part (c) of FIG. 7D, in response to determination that the first calibration value (d) is 8 mm and the second calibration value (ΔΦ) is 43.04 degrees, it may be noted that the accuracy of data on the angle of arrival in the third target angle section is larger than or equal to the predetermined value (Δ).

Figure 8A:
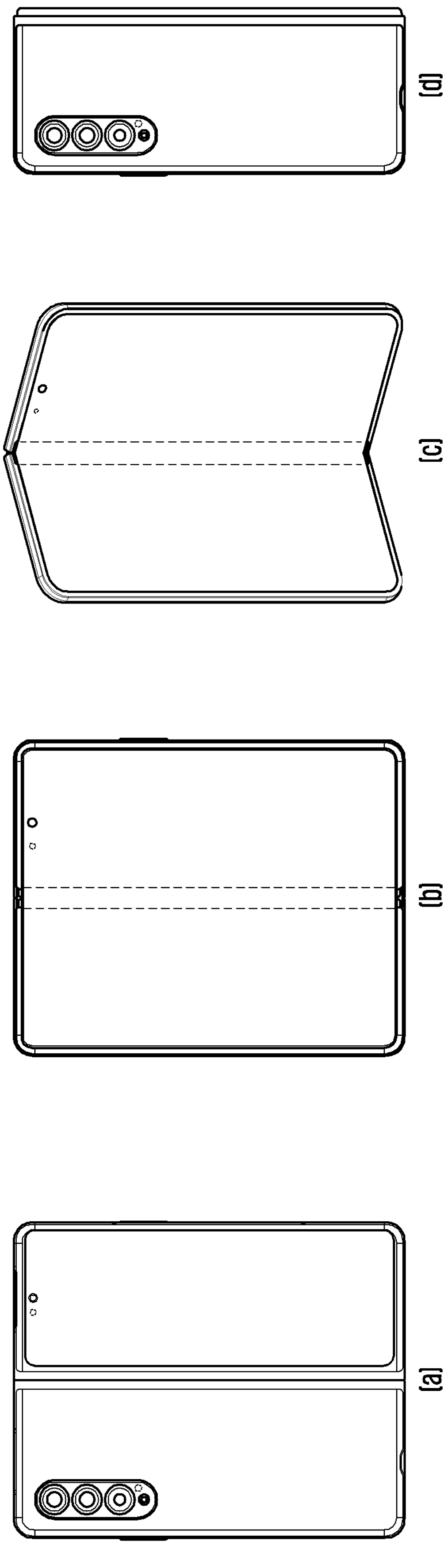
FIGS. 8A and 8B illustrate physical states of an electronic device according to various embodiments of the disclosure.
Figure 8B:
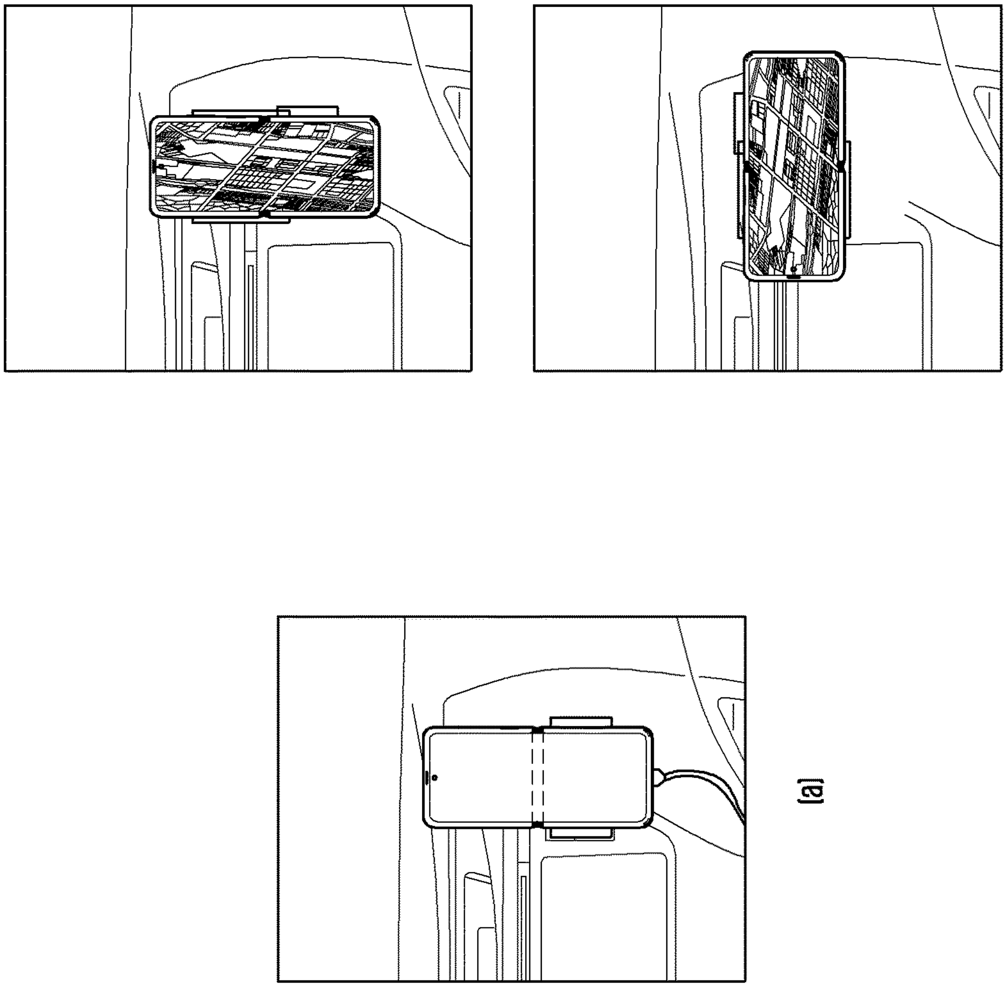

FIGS. 8A and 8B illustrate physical states of an electronic device according to various embodiments of the disclosure.

FIG. 8A illustrates physical states of a foldable electronic device according to various embodiments.

Referring to FIG. 8A, various embodiments of the disclosure, the sensor module 276 may acquire information related to a physical state of the electronic device 200.

According to an embodiment of the disclosure, the sensor module 276 may acquire information related to a position of the electronic device 200 including a laid state of the electronic device 200. For example, the sensor module 276 may include a gravity sensor, an acceleration sensor, and/or a gyro sensor to acquire information related to the position of the electronic device 200. For example, the sensor module 276 may acquire information related to positions of the electronic device 200, such as a state in which the front surface of the electronic device 200 is laid to face the bottom as illustrated in part (a) of FIG. 8A and a state in which the front surface of the electronic device 200 is laid to face the top as illustrated in part (b) of FIG. 8A.

According to an embodiment of the disclosure, when the electronic device 200 is a foldable electronic device which can be folded or unfolded, the sensor module 276 may acquire information related to a folding state of the electronic device 200. For example, the sensor module 276 may acquire information related to the folding state of the electronic device 200, such as an unfolded state (opened state) of the electronic device 200 as illustrated in parts (a) and (b) of FIG. 8A, an intermediate state as illustrated in part (c) of FIG. 8A, and a folded state as illustrated in part (d) of FIG. 8A.

FIG. 8B illustrate physical states of an electronic device according to various embodiments.

Referring to FIG. 8B, according to an embodiment of the disclosure, the sensor module 276 may acquire information related to a charging state of the electronic device 200. For example, the sensor module 276 may acquire whether the electronic device 200 is connected to a charging device to receive power. For example, the sensor module 276 may acquire information related to a connected state between the electronic device 200 and the charging device as illustrated in part (a) of FIG. 8B.

According to an embodiment of the disclosure, the sensor module 276 may acquire information related to a position of the electronic device 200 including a holding state of the electronic device 200. For example, the sensor module 276 may include a gravity sensor, an acceleration sensor, and/or a gyro sensor to acquire information related to the position of the electronic device 200. For example, the sensor module 276 may acquire information related to positions of the electronic device 200, such as a state in which the electronic device 200 is vertically held as illustrated in the upper part (b) of FIG. 8B and a state in which the electronic device 200 is horizontally held as illustrated in the lower part (b) of FIG. 8B.

Figure 9:
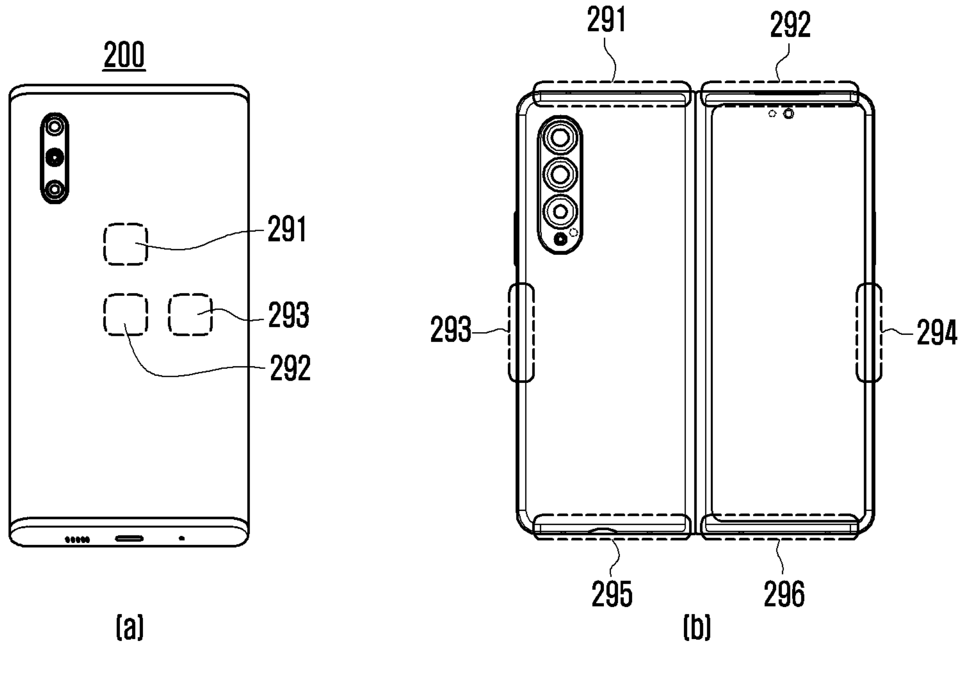
FIG. 9 illustrates at least one antenna module included in an electronic device according to an embodiment of the disclosure.

FIG. 9 illustrates at least one antenna module included in an electronic device according to an embodiment of the disclosure. FIG. 9 illustrates an example of antenna modules which can be included in the electronic device 200, and the electronic device 200 may include antenna modules in various forms and locations and thus the location, form, and the number of antenna modules included in the electronic device 200 are not limited to those illustrated in FIG. 9.

Referring to part (a) of FIG. 9, the electronic device 200 may include a first antenna module 291, a second antenna module 292, and/or a third antenna module 293.

The processor 220 according to an embodiment may use at least one antenna module among the first antenna module 291, the second antenna module 292, and/or the third antenna module 293, and a combination of the antenna modules for UWB communication. For example, the processor 220 may use the first antenna module 291 and the second antenna module 292 for UWB communication. For example, the processor 220 may use the first antenna module 291 and the third antenna module 293 for UWB communication. For example, the processor 220 may use the second antenna module 292 and the third antenna module 293 for UWB communication.

Referring to part (b) of FIG. 9, the electronic device 200 may include the first antenna module 291, the second antenna module 292, the third antenna module 293, a fourth antenna module 294, a fifth antenna module 295, and/or a sixth antenna module 296. The processor 220 according to an embodiment may use at least one antenna module among the first antenna module 291, the second antenna module 292, the third antenna module 293, the fourth antenna module 294, the fifth antenna module 295, and/or the sixth antenna module 296, and a combination of the antenna modules for UWB communication.

The processor 220 according to an embodiment may determine an antenna module to be used for UWB communication, based on the state of the electronic device 200. For example, the processor 220 may determine the antenna module to be used for UWB communication among at least one antenna, based on the position of the state of the electronic device 200 (for example, the inclination, the holding state, or the laid state), the folded or unfolded state of the foldable electronic device 200, the expansion or reduction state of the display of the rollable electronic device 200, and/or the charging state.

The processor 220 according to an embodiment may identify a state in which a specific antenna is being used. For example, the processor 220 may identify an antenna being sued for UWB communication among a plurality of antennas included in the UWB module 290. For example, the processor 220 may identify information related to at least one antenna (for example, the location, type, and/or size of the antenna) being used for an AoA function.

An electronic device 200 according to various embodiments of the disclosure may include a UWB communication circuit including at least one antenna configured to acquire signals from an external electronic device 200, a processor 220 operatively connected to the UWB communication circuit, and a memory 230 operatively connected to the processor 220, and the memory 230 may be configured to store one or more instructions which, when executed, cause the processor or the electronic device to: when executed, acquire at least one signal from the at least one antenna, determine a phase-difference-of-arrival of the at least one signal, acquire information related to a state of the electronic device 200, acquire a calibration value corresponding to the acquired state information of the electronic device 200 from the memory 230, and determine an angle-of-arrival, based on the phase-difference-of-arrival of the signal and the calibration value.

In the electronic device 200 according to various embodiments of the disclosure, the processor 220 may be configured to acquire a default calibration value from the memory 230.

In the electronic device 200 according to various embodiments of the disclosure, the processor 220 may be configured to determine a temporary angle, based on the default calibration value and the phase-difference-of-arrival of the signal.

In the electronic device 200 according to various embodiments of the disclosure, the processor 220 may be configured to determine a target angle section including the temporary angle.

In the electronic device 200 according to various embodiments of the disclosure, the processor 220 may be configured to acquire the calibration value corresponding to the acquired state information of the electronic device and the determined target angle section.

In the electronic device 200 according to various embodiments of the disclosure, the calibration value may include a first calibration value related to a distance between the at least one antenna and a second calibration value related to an offset value of the phase-difference-of-arrival of the signal.

The electronic device 200 according to various embodiments of the disclosure may further include a sensor module 276 configured to acquire physical states including a state related to a folding angle of the electronic device, a position, and a charging state, and the processor 220 may be configured to acquire information related to the state of the electronic device 200 from the sensor module 276, based on the physical state.

In the electronic device 200 according to various embodiments of the disclosure, the processor 220 may be configured to determine an antenna to be used among the at least one antenna in response to the physical state and acquire a calibration value corresponding to a state in which the determined antenna is used.

In the electronic device 200 according to various embodiments of the disclosure, the processor 220 may be configured to acquire state information of a case including a state in which the case is attached to the electronic device, a state in which no case is attached, or a type of the attached case.

In the electronic device 200 according to various embodiments of the disclosure, the processor 220 may be configured to acquire information on a state of execution of a specific application from the memory 230.

In the electronic device 200 according to various embodiments of the disclosure, the specific application may include an application based on augmented reality, such as displaying information related to an external object on a screen captured by a camera.

A method of operating an electronic device according to various embodiments comprises acquiring at least one signal from the at least one antenna, determining a phase-difference-of-arrival of the at least one signal, acquiring information related to a state of the electronic device, acquiring a calibration value corresponding to the acquired state information of the electronic device from a memory, and determining an angle-of-arrival, based on the phase-difference-of-arrival of the signal and the calibration value.

The method according to various embodiments further comprising acquiring a default calibration value from the memory.

The method according to various embodiments further comprising determine a temporary angle, based on the default calibration value and the phase-difference-of-arrival of the signal.

The method according to various embodiments further comprising determining a target angle section comprising the temporary angle.

The acquiring of the calibration value corresponding to the state of the electronic device according to various embodiments further comprising acquiring a calibration value corresponding to the determined target angle section.

The calibration value according to various embodiments comprises a first calibration value related to a distance between the at least one antenna and a second calibration value related to an offset value of the phase-difference-of-arrival of the signal.

The method according to various embodiments further comprising acquiring information related to physical states comprising a state related to a folding angle of the electronic device, a position, and a charging state through the sensor module.

The method according to various embodiments further comprising determining an antenna to be used among the at least one antenna, based on the physical state and acquiring a calibration value corresponding to a state in which the determined antenna is used.

The method according to various embodiments further comprising acquiring state information of a case comprising a state in which the case is attached to the electronic device, a state in which no case is attached, or a type of the attached case.

The method according to various embodiments further comprising acquiring information on a state of execution of a specific application from the memory.

The specific application according to various embodiments comprises an application based on augmented reality, such as displaying information related to an external object on a screen captured by a camera.

It should be appreciated that various embodiments of the disclosure and the terms used therein are not intended to limit the technological features set forth herein to particular embodiments and include various changes, equivalents, or replacements for a corresponding embodiment.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:

an ultra-wideband (UWB) communication circuit comprising at least two antennas;

memory storing instructions; and a processor operatively connected to the UWB communication circuit and the memory, wherein the instructions, when executed by the processor, cause the foldable electronic device to:

obtain at least two signals respectively received at the at least two antennas from an external electronic device, determine a phase-difference-of-arrival of the at least two signals based on a phase of each of the at least two signals, identify information related to a folding angle of the foldable electronic device, identify, from the memory, calibration information corresponding to the identified information related to the folding angle, the calibration information being for determining an angle-of-arrival of the at least two signals, and determine the angle-of-arrival of the at least two signals, based on the phase-difference-of-arrival of the at least two signals and the calibration information.

2. The foldable electronic device of claim 1, wherein the instructions, when executed by the processor, further cause the foldable electronic device to:

identify default calibration information from the memory, and determine a temporary angle, based on the default calibration information and the phase-difference-of-arrival of the at least two signals.

3. The foldable electronic device of claim 2, wherein the instructions, when executed, by the processor, further cause the foldable electronic device to:

determine a target angle section comprising the temporary angle, and identify the calibration information corresponding to the identified information of the foldable electronic device and the determined target angle section.

4. The foldable electronic device of claim 1, wherein the calibration information comprises first calibration information related to a distance between the at least two antennas and second calibration information related to an offset of the phase-difference-of-arrival of the at least two signals.

5. The foldable electronic device of claim 1, further comprising:

a sensor module, wherein the folding angle of the foldable electronic device is obtained from the sensor module, and wherein the instructions, when executed by the processor, further cause the foldable electronic device to:

determine an antenna to be used among the at least two antennas based on the information related to a state of the foldable electronic device, and identify the calibration information corresponding to the state in which the determined antenna is used.

6. A method of operating a foldable electronic device, the method comprising:

obtaining at least two signals respectively received at least two antennas from an external electronic device;

determining a phase-difference-of-arrival of the at least two signals based on a phase of each of the at least two signals;

identifying information related to a folding angle of the foldable electronic device;

identifying, from a memory, calibration information corresponding to the identified information related to the folding angle, the calibration information being for determining an angle-of-arrival of the at least two signals; and determining the angle-of-arrival of the at least two signals, based on the phase-difference-of-arrival of the at least two signals and the calibration information.

7. The method of claim 6, further comprising:

identifying a default calibration information from the memory; and determining a temporary angle, based on the default calibration information and the phase-difference-of-arrival of the at least two signals.

8. The method of claim 7, further comprising:

determining a target angle section comprising the temporary angle; and identifying calibration information corresponding to the identified information of the foldable electronic device and the determined target angle section.

9. The method of claim 6, wherein the calibration information comprises first calibration information related to a distance between the at least two antennas and second calibration information related to an offset of the phase-difference-of-arrival of the at least two signals.

10. The method of claim 7, further comprising:

determining an antenna to be used among the at least two antennas, based on the identified information related to a state of the foldable electronic device; and identifying calibration information corresponding to the state in which the determined antenna is used.

11. The method of claim 10, wherein the folding angle of the foldable electronic device is obtained from a sensor module.

12. One or more non-transitory computer-readable storage media storing one or more computer programs including computer-executable instructions that, when executed by one or more processors of a foldable electronic device, cause the foldable electronic device to perform operations, the operations comprising:

obtaining at least two signals respectively received at least two antennas from an external electronic device;

determining a phase-difference-of-arrival of the at least two signals based on a phase of each of the at least two signals;

identifying information related to a folding angle of the foldable electronic device;

identifying, from memory, calibration information corresponding to the identified information of the foldable electronic device, the calibration information being for determining an angle-of-arrival of the at least two signals; and determining the angle-of-arrival of the at least two signals, based on the phase-difference-of-arrival of the at least two signals and the calibration information.

13. The one or more non-transitory computer-readable storage media of claim 12, the operations further comprising:

identifying default calibration information from the memory;

determining a temporary angle, based on the default calibration information and the phase-difference-of-arrival of the at least two signals;

determining a target angle section comprising the temporary angle; and identifying calibration information corresponding to the determined target angle section.

* * * * *